United States Patent
Murching et al.

(12) 
(10) Patent No.: US 11,094,118 B2
(45) Date of Patent: *Aug. 17, 2021

(54) DEVICE PANEL CAPABILITIES AND SPATIAL RELATIONSHIPS

(71) Applicant: Microsoft Technology Licensing, LLC, Redmond, WA (US)

(72) Inventors: Arvind M. Murching, Sammamish, WA (US); James G. Cavalaris, Kirkland, WA (US); Adam Lenart, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,138

(22) Filed: Jan. 15, 2020

(65) Prior Publication Data
US 2020/0265642 A1    Aug. 20, 2020

Related U.S. Application Data

(63) Continuation of application No. 15/987,444, filed on May 23, 2018, now Pat. No. 10,586,389.

(60) Provisional application No. 62/526,227, filed on Jun. 28, 2017.

(51) Int. Cl.
*G06T 19/00*    (2011.01)
*G06F 9/451*    (2018.01)
*G06F 1/16*    (2006.01)
*G06T 19/20*    (2011.01)

(52) U.S. Cl.
CPC ............ *G06T 19/00* (2013.01); *G06F 1/1615* (2013.01); *G06F 9/451* (2018.02); *G06T 19/20* (2013.01); *G06F 2200/1637* (2013.01); *G06T 2219/004* (2013.01); *G06T 2219/028* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 2010/0085274 | A1* | 4/2010 | Kilpatrick, II | H04M 1/0247 345/1.3 |
| 2016/0328808 | A1* | 11/2016 | Willis | G06Q 50/04 |
| 2018/0101586 | A1* | 4/2018 | Mao | G06F 16/2365 |

* cited by examiner

*Primary Examiner* — Frank S Chen

(57) ABSTRACT

Aspects of the disclosure provide a system having a memory area associated with a computing device and a processor. The processor executes to classify device panel descriptors and location descriptors according to associated device instances. The processor generates device panel objects using the classified device panel descriptors and location descriptors. A schema comprising device panel locations and adjacency relationship information is populated for the computing device based on the generated device panel objects. The processor provides the populated schema as dynamic device properties to one or more operations executing on the computing device.

19 Claims, 17 Drawing Sheets

(From the ACPI Specification)

(From the ACPI Specification)

(From the ACPI Specification)

(From the ACPI Specification)

Table 6-170 PLD Back Panel Example Settings

| Name | Ignore Color | R | G | B | Width | Height | VOff | HOff | Shape | Notation | Group Position | Rotation |
|---|---|---|---|---|---|---|---|---|---|---|---|---|
| Back Panel | Yes | 0 | 0 | 0 | 2032 | 4318 | 0 | 0 | V Rect | | 1 | 0 |
| MB Conn area | Yes | 0 | 0 | 0 | 445 | 1556 | 1588 | 127 | V Rect | | 2 | 0 |
| Power Supply | Yes | 0 | 0 | 0 | 1524 | 889 | 3302 | 127 | H Rect | | 2 | 0 |
| USB Port 1 | No | 0 | 0 | 0 | 125 | 52 | 2223 | 159 | H Rect | C1 | 3 | 90 |
| USB | No | 0 | 0 | 0 | 125 | 52 | 2223 | 254 | H | C2 | 3 | 90 |

(From the ACPI Specification)

| Panel ID | Group ID | Dimensions | ALS | Accel/ Mag/ Gyro | Proxim Detect | Front Cam | Rear Cam | Touch ID |
|---|---|---|---|---|---|---|---|---|
| 1 | A | 100x200 | ALS_ID_4 | AMG_ID_5 | PRX_ID_7 | CAM_ID_6 | None | TCH_ID_1 |
| 2 | B | 700x300 | None | AMG_ID_7 | None | None | CAM_ID_5 | TCH_ID_4 |
| ⋮ | | | | | | | | |

FIG. 25

| Upper Group ID | Upper Panel ID | Lower Group ID | Lower Panel ID | X Offset | Inter-panel gap | Angle Sensor ID |
|---|---|---|---|---|---|---|
| A | 1 | C | 6 | X Off<A1-C6> | Vert- Gap<A1 -C6> | ANG_ID_6 |
| ⋮ | | | | | | |

FIG. 26

| Lower Group ID | Left Panel ID | Right Group ID | Right Panel ID | Y Offset | Inter-Panel gap | Angle Sensor ID |
|---|---|---|---|---|---|---|
| B | 5 | C | 6 | Y Off<B5- C6> | Horiz- Gap<B5-C6> | None |
| ⋮ | | | | | | |

FIG. 27

DEVICE PANEL CAPABILITIES AND SPATIAL RELATIONSHIPS

CROSS-REFERENCE TO RELATED APPLICATION

This application is a continuation application of and claims priority to U.S. patent application Ser. No. 15/987,444, entitled "DEVICE PANEL CAPABILITIES AND SPATIAL RELATIONSHIPS," filed on May 23, 2018, the disclosure of which is incorporated herein by reference in its entirety.

BACKGROUND

The traditional personal computer (PC) has evolved over time to become a more integrated system with many different form factors. Desktop PCs with loosely attached peripheral devices have evolved into laptops with integrated peripherals. Laptops have further evolved into tablets, convertibles, and detachables. In addition, a variety of peripheral devices have been developed for integration with or compatible interaction with these systems. Integrated components are increasingly used together to understand the environment of the system and adapt it for specific scenarios.

SUMMARY

Aspects of the disclosure provide a system having a memory area associated with a computing device and a processor. The processor executes to classify device panel descriptors and location descriptors according to associated device instances. The processor generates device panel objects using the classified device panel descriptors and location descriptors. A schema comprising device panel locations and adjacency relationship information is populated for the computing device based on the generated device panel objects. The processor provides the populated schema as dynamic device properties to one or more operations executing on the computing device.

Aspects of the disclosure further provide a method for providing dynamic device properties to applications executing on a computing system. Device panel and location descriptors are classified according to associated device instances. Device panel objects are generated using the classified device panel and location descriptors. A schema is populated comprising device panel locations and adjacency relationship information for the computing device based on the generated device panel objects. The populated schema is provided as the dynamic device properties to one or more operations executing on the computing device.

Still other aspects of the disclosure provide one or more computer storage devices having computer-executable instructions stored thereon for providing dynamic device properties to applications executing on a computer. On execution by the computer, the computer-executable instructions cause the computer to perform operations. These operations include classifying device panel and location descriptors according to associated device instances, generating device panel objects using the classified device panel and location descriptors, populating a schema comprising device panel locations and adjacency relationship information for the computing device based on the generated device panel objects, and providing the populated schema as the dynamic device properties to one or more operations executing on the computing device.

BRIEF DESCRIPTION OF THE DRAWINGS

FIG. 25 is an exemplary block diagram illustrating a simplified panel capabilities table.

FIG. 26 is an exemplary block diagram illustrating a vertical adjacency table.

FIG. 27 is an exemplary block diagram illustrating a horizontal adjacency table.

Corresponding reference characters indicate corresponding parts throughout the drawings.

DETAILED DESCRIPTION

Figure 1:
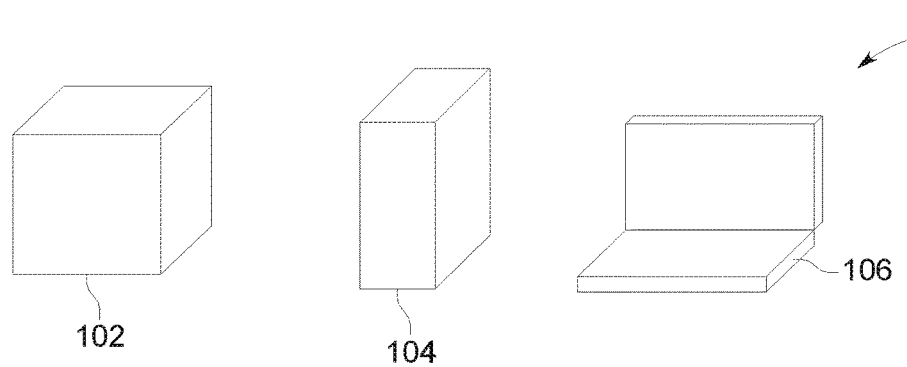
FIG. 1 is an exemplary block diagram illustrating cabinets of various system enclosures.

Referring to the figures, examples of the disclosure provide for the addition of panels as first-class objects into a peripheral device platform, providing an end-to-end solution for enabling original equipment manufacturer (OEM) or independent hardware vendor (IHV) hardware manufacturers to describe physical device panel locations, adjacency relationships, and other attributes that are abstracted by a data model to provide a high level application programming interface (API) for device and application developers to work with spatial relationships of devices.

Aspects of the disclosure further provide increased user interaction performance by providing a mechanism for understanding spatial relationships, as well as a language for expressing preferences and constraints on those relationships. By providing a mechanism for an operating system (OS) and/or developer to identify the precise physical location of peripheral devices that may be integrated into an OEM-manufactured computer, aspects of this disclosure enable the ability to make use of peripherals for specialized scenarios in application development The resulting efficiency improvements in user interactions saves the user time by reducing or eliminating the need for the application developer to manually identify device capabilities during application development, and tailors user experiences to a given device form factor.

As described herein, examples of the disclosure provide information about spatial relationships between devices, leveraging device enumeration application programming interfaces (APIs) and underlying peripheral device infrastructure as the 'common currency' for devices that participate in scenarios that require an understanding of spatial and scenario relationships between multiple devices. This information may be presented as a schema consumable by the OS. By leveraging mechanisms for describing the physical enclosure of the system chassis, and the enclosure-relative panel locations of integrated devices, making additional device properties, integrated device locations, and APIs available for application and system components to discover and evaluate for unique device relationships relative to the physical enclosure, as well as the dynamic influence of system posture or orientation, aspects of the disclosure provide a schema that may be used to understand device capabilities and relative spatial relationships of any existing and future systems. Applications and system components may select location-appropriate devices dynamically, through existing device selection patterns of the corresponding device classes. In addition, a new set of properties and relationships APIs may facilitate application and system component discovery and evaluation of the spatial relationships between devices.

Additionally, aspects of the disclosure use the underlying peripheral store, such as a Plug and Play (PnP) store, for example, in various scenarios to store information about scenario relationships that may not involve device location, enabling device enumeration API patterns to be used for device discovery and notification. These scenario-based association properties may be used to create queries that produce a meaningful collection of devices for use by a device platform.

The traditional personal computer (PC) has evolved over time to become a more integrated system with many different form factors. Desktop PCs with loosely attached peripheral devices have evolved into laptops with integrated peripherals; laptops have further evolved into tablets, convertibles, and detachables. Throughout this evolution, it has become increasingly important to understand not only whether some peripheral has been integrated with the system or not (e.g. internal webcam), but also how the peripheral has been integrated with the system. Integrated components are increasingly used together to understand the environment of the system and adapt it for specific scenarios (e.g. ambient light sensors work in conjunction with display devices to control brightness). Multiple instances of integrated peripherals are also increasingly common, making it more important to understand not only where those peripherals are relative to the system, but also where they are relative to each other (e.g. a camera may be considered a front-facing or a rear-facing camera relative to the current display).

New and emerging devices may include multiple panels arranged on a system chassis and/or virtual reality (VR) headsets in innovative ways. A panel is a physical surface that may, for example, include at least one of display and touch capabilities, and optionally sensors, such as ambient light sensors (ALS), proximity sensors, cameras, and the like. The OS needs a logical representation of these panels, their capabilities, and spatial relationships between them in order to tailor user experiences to the device form factor, such as user experiences that span multiple adjacent panels for example. Specifically, OS stacks need to know (a) associations or affiliations between components on the same panel (e.g. touch sensor with corresponding display) and (b) physical adjacencies between panels. Aspects of this disclosure provide a logical representation, or schema, for an arbitrary multi-panel system, including existing single-panel systems and emerging multi-panel systems, which may be used to understand the device capabilities and spatial relationships of devices within a particular system. Additionally, dynamically added panels may be discovered and interrogated for device panel location and adjacency relationship information to understand dynamic changes in capabilities as well.

Aspects of the disclosure provide a mechanism or schema for describing different physical aspects and capabilities of a system. The schema may be consumed by an OS, or used by application developers, to produce different experiences on the hardware because the topologies of the system as well as capabilities of system components are exposed with sufficient information to enable building of the different experiences around those objects or devices of the system. By providing spatial information about where device components are located relative to each other, mapping the hardware implementation to a physical space, and formalizing a model that allows the association of a device to a discrete location of the system enclosure, the information may be queried to understand and/or create various experiences and scenarios. In addition, this schema is generalized to accommodate future hardware implementations that are yet unknown.

As used herein, a device refers to a single instance of physical piece of hardware, such as, for example and without limitation, a central processing unit (CPU), peripheral component interconnect (PCI) bus, storage disk, universal serial bus (USB) controller, keyboard, mouse, monitor, and the like. A device is represented in the OS as a node within a tree hierarchy, where bus drivers discover and report device relationships relative to the respective devices they control. A device may also represent a virtual or logical software entity for the purpose of simulating physical hardware and/or integrating into a device usage model.

As used herein, a system refers to a collection of integrated hardware devices that comprise a fully functional computer/PC, such as a desktop, laptop, or phone, for example. A peripheral, as used herein, refers to a collection of devices that are ancillary to the operation of a computer, typically for input/output purposes. While peripherals such as mice, keyboards, webcams, and monitors may be externally detachable from some systems, such as a desktop computer, they may also be integrated into other systems, such as a laptop. In some examples, a system may include both external and integrated peripherals.

An enclosure, as used herein, refers to a physical chassis or case that contains one or more devices, such as a system enclosure that contains an entire functional computer for example. Some common system enclosure form-factors may include desktop, laptop, tablet, and phone systems. An enclosure may also refer to the physical case that contains a peripheral device, such as a webcam or monitor. A multi-function device, as used herein, refers to a collection of externally-connected peripheral devices that are contained within the same physical enclosure. For example, a multi-function printer, which contains both print and scan devices, is one example of a multi-function device.

A container, as used herein, refers to a virtual representation of a physical system or peripheral enclosure, as seen by the OS for the purpose of grouping integrated non-removable devices. In the example of a desktop computer, the computer enclosure, monitor, mouse, and keyboard are each grouped into individual containers, while in the example of a laptop the monitor, trackpad mouse, and keyboard are all in a single container.

In some examples, a panel may refer to a flat rectangular surface that represents a single physical face of an enclosure. A panel has well-defined dimensions and may expose on its surface zero or more devices from inside of the enclosure at well-defined positional offsets. A panel may also be used as a reference for positioning an internal device underneath its surface. In some examples, panels may occur in groups of six to form cuboid shaped boxes, where each edge of a panel is always adjacent to an edge of another panel in the group in order to form a closed volume. In other examples, panels may occur in other groupings to form more complex shapes. For example, a panel may refer to a flat, polygon surface that represents a single physical face of an enclosure and may occur in groups of three or more to form a convex polyhedron.

A cabinet, as used herein, refers to a sub-compartment of an enclosure, shaped as a cuboid comprised of six panels, also referred to as a panel group. One or more cabinets compose an enclosure, where each additional cabinet of an enclosure is attached to another cabinet along some panel edge or face in order to form a single discrete entity. A typical desktop computer enclosure has one cabinet, while a laptop enclosure has two cabinets—one for the base of the computer and the other for the lid containing the monitor.

A computer, or computing device, as used herein, represents any device executing instructions (e.g., as application programs, operating system functionality, or both) to implement the operations and functionality as described herein. The computing device may include a mobile computing device or any other portable device. In some examples, the mobile computing device includes a mobile telephone, laptop, tablet, computing pad, netbook, gaming device, wearable device and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor, a memory area, a system bus that couples together various system components including the system memory to the processor, and at least one user interface. The processor includes any quantity of processing units and is programmed to execute computer-executable instructions for implementing aspects of the disclosure. The instructions may be performed by the processor or by multiple processors within the computing device or may be performed by a processor external to the computing device. In some examples, the processor is programmed to execute instructions, such as those described herein.

In some examples, the processor represents an implementation of analog techniques to perform the operations described herein. For example, the operations may be performed by an analog computing device and/or a digital computing device.

The system bus may be any of several types of bus structures, including a memory bus or memory controller, a peripheral bus, and a local bus using any of a variety of bus architectures.

The computing device further has one or more computer-readable media such as the memory area. The memory area includes any quantity of media associated with or accessible by the computing device. The memory area may be internal to the computing device, external to the computing device, or both. Computer-readable media may include both volatile and nonvolatile media, and removable and non-removable media. In some examples, the memory area includes read-only memory and/or memory wired into an analog computing device, which may store an operating system for the computing device.

The memory area stores, among other data, one or more applications. The applications, when executed by the processor, operate to perform functionality on the computing device. The memory area further stores one or more computer-executable components. Exemplary components may include a user interface component.

By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information, and which may be accessed by the computer. Computer storage media does not, however, include propagated signals. Rather, computer storage media excludes propagated signals. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory includes computer storage media in the form of volatile and/or nonvolatile memory such as read only memory (ROM) and random-access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by a processing unit or processor.

The computer may also include other removable/non-removable, volatile/nonvolatile computer storage media, such as, for example only, a hard disk drive that reads from or writes to non-removable, nonvolatile magnetic media, a universal serial bus (USB) port that provides for reads from or writes to a removable, nonvolatile memory, and an optical disk drive that reads from or writes to a removable, non-volatile optical disk such as a CD ROM or other optical media. Other removable/non-removable, volatile/nonvolatile computer storage media that may be used in an exemplary operating environment include, but are not limited to, magnetic tape cassettes, flash memory cards, digital versatile disks, digital video tape, solid state RAM, solid state ROM, and the like. The hard disk drive is typically connected to the system bus through a non-removable memory interface, and a USB port and optical disk drive are typically connected to the system bus by a removable memory interface.

Referring again to FIG. 1, an exemplary block diagram illustrating various system enclosures is provided. Enclosure 102, enclosure 104, and enclosure 106 are some illustrative examples of cuboid enclosures comprised of six panels. Enclosure 102 may be an illustrative example of a desktop monitor, while enclosure 104 may be an illustrative example of a desktop tower. Enclosure 106 may be an illustrative example of a laptop having a clamshell form-factor formed by a base cabinet and a lid cabinet.

While there are many unique scenarios that require knowledge that multiple devices are "related", they often differ based on the nature of the relationship that is required for the scenario. Depending on the device, there may be constraints based on what is known (or may be known) about the spatial relationship of the device, both to the system enclosure and to other devices. Some device relationships may also exist solely for how the device relationship is used for a given scenario. Spatial relationships refer to relative physical relationships that devices have to each other, to their physical enclosure, and to their physical surroundings. One of the forms of a spatial relationship that may be expressed between two devices is whether they are contained within the same physical enclosure. Two devices which are enclosed by a single physical chassis are considered to be within the same physical enclosure. An external device that is connected by an externally-reachable port is considered to be in a different physical enclosure from the bus device to which it is attached.

The system chassis is a well-known enclosure, such as the "PC" or "Computer" itself, and defines a "shared enclosure" relationship between all devices in the chassis. Similarly, a multi-function device may define a "shared enclosure" relationship between the externally connected devices that share the same chassis, and a "different enclosure" relationship between those devices and other devices within the PC. For example, the integrated graphics adapter and primary hard disk drive devices of a PC are within the same physical enclosure (i.e. the "Computer"). As another example, while the scanner and printer devices of an externally connected USB multi-function device are in the same physical enclosure as each other, both are in a different physical enclosure from the integrated graphics adapter of the PC. The common scenarios for this type of "shared enclosure" versus "different enclosure" relationship may include: determining whether a device is internal or external to a PC; determining whether two devices are within the same enclosure; identifying a device of a given class that is internal to the PC; identifying a device of a given class that is in the same enclosure as some reference device; and so on. However, these types of relationships describe whether two devices share the same physical enclosure. They do not describe a device's relative location within that enclosure, or to other devices. While this type of relationship may be derived if more specific spatial information about the device is known, such as panel location relative to an enclosure, properties about a device's connectivity are typically retrieved separate from information about its enclosure. For some systems, and most external multi-function device chassis, rich enclosure information has not previously been defined or available in a format suitable for consumption by the OS as part of a general-purpose software platform. Whether two devices exist in the same enclosure may be the most that has been known for most common devices.

In addition to the knowledge that two devices are located within some physical enclosure, it is often desirable to know specific information about their precise spatial locations, relative to that enclosure. To understand these relationships requires an understanding of the physical characteristics of the enclosure, and relative locations of the devices within that enclosure. Assuming the enclosure itself is adequately described, and devices are described relative to the enclosure, it may be possible to infer some form of spatial relationship among devices in the same enclosure.

For the purposes of modeling a typical physical computer system and external device enclosures, enclosures may be modeled based on cuboids, made up of six rectangular, or four-sided, faces as panels, such as enclosure 102. This does not necessarily preclude a single enclosure from being composed of multiple cuboids, or cabinets. For example, while a desktop tower or tablet enclosure may be modeled as a single cuboid, such as enclosure 104, a clamshell form-factor, such as a laptop, may be modeled using two cabinets, such as enclosure 106, and so on.

Figure 2:
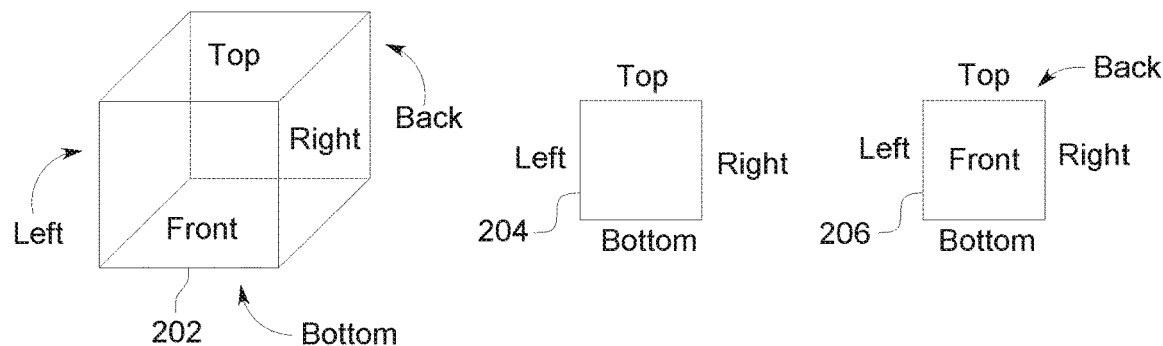
FIG. 2 is an exemplary block diagram illustrating panel relationships of a cabinet.

FIG. 2 is an exemplary block diagram illustrating panel relationships of a cabinet, or cabinet adjacency relationships. A cabinet consists of six panels that implicitly form a six-sided cuboid. In order to describe an adjacency relationship between two cabinets, it is necessary to refer to specific panels and/or edges of the cabinets.

The Advanced Configuration and Power Interface (ACPI) standard is used by operating systems to discover and configure computer hardware components, to perform power management, and to perform status monitoring. The ACPI specification describes a means for a computer system manufacturer to specify various attributes of peripheral devices that have been integrated within a computer system. Internally, ACPI advertises the available components and their functions to the OS kernel using methods provided through system firmware, such as UEFI or BIOS, which the kernel parses. ACPI then executes the desired operations using an embedded minimal virtual machine (VM). Firmware-level ACPI has three main components: the ACPI tables, the ACPI BIOS, and the ACPI registers. The tables provide description of system hardware in a platform-independent manner, including the Physical Location of Device (PLD) descriptor (or Physical Location Descriptor).

The PLD descriptor, as defined by a static _PLD object (or dynamic control method that evaluates to an object) for a given device node in the ACPI namespace, enables a computer system manufacturer to specify various physical attributes of a device, such as its visibility, physical appearance, and physical location relative to the computer system enclosure. The _PLD object consists of a fixed-size data buffer or pre-defined physical attributes, as well as an extension for OEM-defined data, which may be further interpreted by the operating system or other components.

The following exemplary data structure provides an illustrative description of the _PLD object data:

```
//
// ACPI Physical Location Descriptor, Revision 2
// (per ACPI 4.0 spec, section 6.1.6; now ACPI 6.0 spec,
section 6.1.8)
//
typedef struct _ACPI_PLD_V2_BUFFER {
    UINT32 Revision:7;
    UINT32 IgnoreColor:1;
    UINT32 Color:24;
    UINT32 Width:16;
    UINT32 Height:16;
    UINT32 UserVisible:1;
    UINT32 Dock:1;
    UINT32 Lid:1;
    UINT32 Panel:3;
    UINT32 VerticalPosition:2;
    UINT32 HorizontalPosition:2;
    UINT32 Shape:4;
    UINT32 GroupOrientation:1;
    UINT32 GroupToken:8;
    UINT32 GroupPosition:8;
    UINT32 Bay:1;
    UINT32 Ejectable:1;
    UINT32 EjectionRequired:1;
    UINT32 CabinetNumber:8;
    UINT32 CardCageNumber:8;
    UINT32 Reference:1;
    UINT32 Rotation:4;
    UINT32 Order:5;
    UINT32 Reserved:4;
    UINT32 VerticalOffset:16;
```

-continued

```
    UINT32 HorizontalOffset:16;
} ACPI_PLD_V2_BUFFER, *PACPI_PLD_V2_BUFFER;
```

The _PLD description of each device may include the specific panel surface of the system chassis that the device is associated with. For the purposes of _PLD, a system enclosure is modeled as either a single six-sided cuboid, such as a desktop or tablet form-factor, or a hinged set of two six-sided cuboids, such as a laptop-style form-factor. Panels are defined by the AcpiPldPanel constants, corresponding to the six sides of a cabinet, as shown by cabinet 202—top, bottom, front, back, right, and left. Edges may be similarly defined using a new set of AcpiPldEdge constants, for example:

```
enum AcpiPldEdge {
    AcpiPldEdgeTop      = 0,
    AcpiPldEdgeBottom   = 1,
    AcpiPldEdgeLeft     = 2,
    AcpiPldEdgeRight    = 3,
    AcpiPldEdgeUnknown  = 4,
};
```

Such a definition would correspond to the four edges of a panel, as shown in two-dimensional (2D) panel 204: top, bottom, left, right.

Alternatively, the AcpiPldPanel constants may be reused to also specify the edges, even providing the option for referencing the front and back sides of a panel, rather than just the panel edges, as shown in 2D panel 206: top, bottom, left, right, front, back. For example:

```
enum AcpiPldPanel {
    AcpiPldPanelTop     = 0,
    AcpiPldPanelBottom  = 1,
    AcpiPldPanelLeft    = 2,
    AcpiPldPanelRight   = 3,
    AcpiPldPanelFront   = 4,
    AcpiPldPanelBack    = 5,
    AcpiPldPanelUnknown = 6,
};
```

Such a usage model would make it possible to specify cabinet adjacency relative to both panel edges and sides, as discussed further below in FIG. 3.

Figure 3:
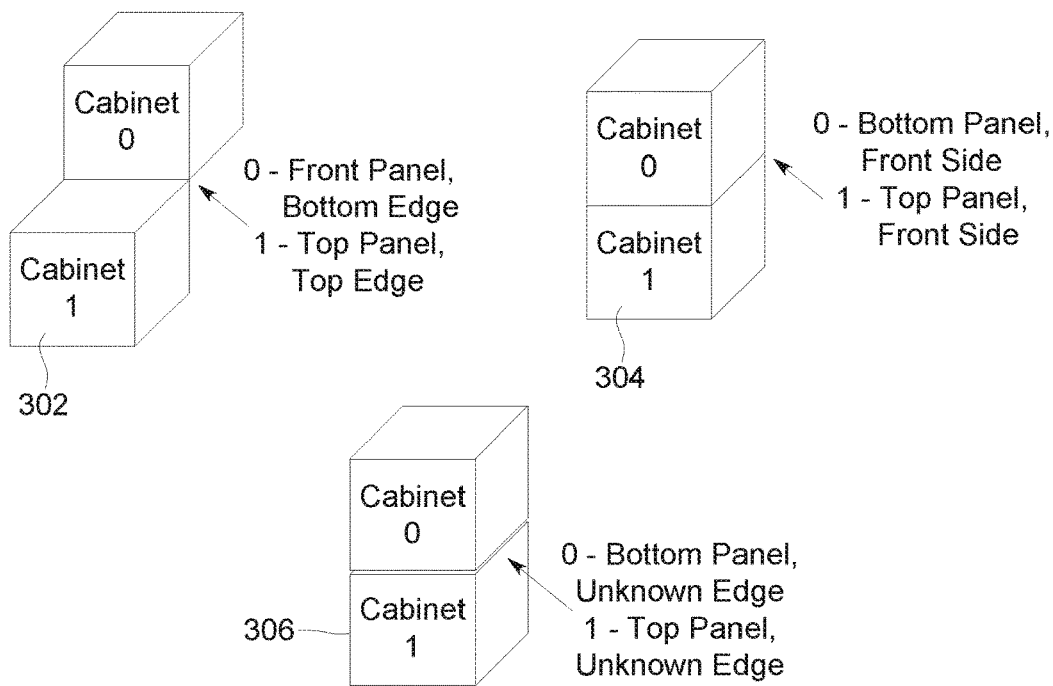
FIG. 3 is an exemplary block diagram illustrating cabinet adjacencies.

FIG. 3 is an exemplary block diagram illustrating cabinet adjacencies relative to both panel edges and sides. As depicted in cabinet adjacency model 302, cabinet-0 is adjacent to cabinet-1 via the front panel, bottom edge of cabinet-0 and the top panel, top edge of cabinet-1. Cabinet adjacency model 304 illustrates another relationship, where cabinet-0 is adjacent to cabinet-1 via the bottom panel, front side of cabinet-0 and the top panel, front side of cabinet-1. In another illustrative relationship description, it may be necessary to specify adjacency relative to the back of the panel (i.e. inside the cabinet), as opposed to the front, so the relationship may be expressed using edges, where an unspecified/unknown edge is treated as a panel side adjacency. In this illustrative example, cabinet adjacency model 306 may be expressed as cabinet-0 adjacent to cabinet-1 via the bottom panel, unknown edge of cabinet-0 and the top panel, unknown edge of cabinet-1.

Figure 4:
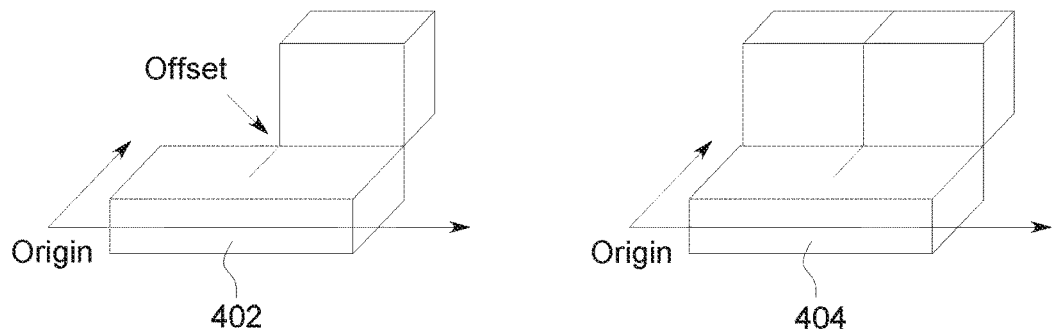
FIG. 4 is an exemplary block diagram illustrating cabinet adjacencies with positional offsets.

FIG. 4 is an exemplary block diagram illustrating cabinet adjacencies with positional offsets. In addition to defining inter-cabinet panel adjacencies along fixed reference edges, some cabinet configurations may benefit from the ability to adjust positional offsets and rotations. For example, one cabinet may have a shorter adjacent edge than another cabinet, where the joint between these cabinets begins at some offset along the edge, such as cabinet adjacency model 402. In another example, multiple cabinets may share a common edge on another cabinet, such as cabinet adjacency model 404.

Figure 5:
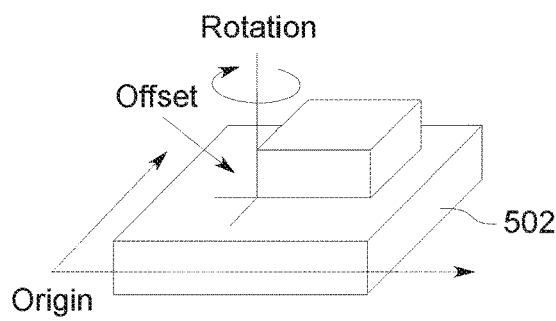
FIG. 5 is an exemplary block diagram illustrating cabinet adjacencies with rotational offsets.

FIG. 5 is an exemplary block diagram illustrating cabinet adjacencies with rotational offsets. In this example, one cabinet may have a smaller adjacent side than the other cabinet it is joining, where the joint is at some two-dimensional (2D) offset, possibly also rotated about that offset, such as cabinet adjacency model 502, where the smaller cabinet is offset relative to the larger cabinet and includes a rotational point at the offset.

Figure 6:
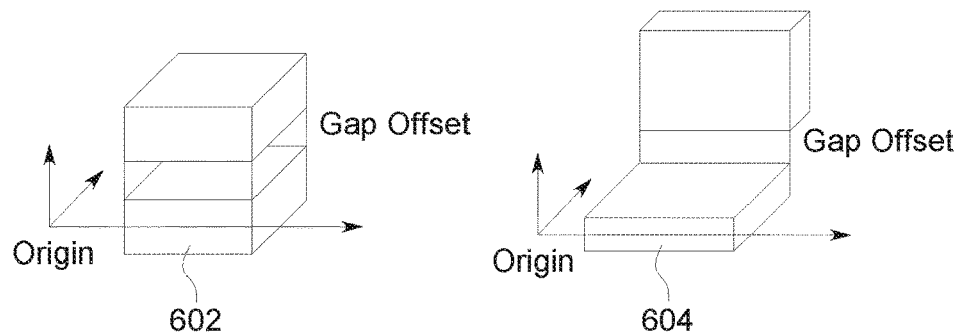
FIG. 6 is an exemplary block diagram illustrating cabinet adjacencies with three-dimensional positional offsets.

FIG. 6 is an exemplary block diagram illustrating cabinet adjacencies with three-dimensional positional offsets. In some scenarios, there may be a desire to specify a positional offset in the third dimension, conceptually seen as a gap between cabinets. As illustrated by cabinet adjacency model 602, a gap offset may be between opposing bottom and top facing panels of two cabinets. In another example, a gap offset may be between two panel edges, as depicted in cabinet adjacency model 604.

Figure 7:
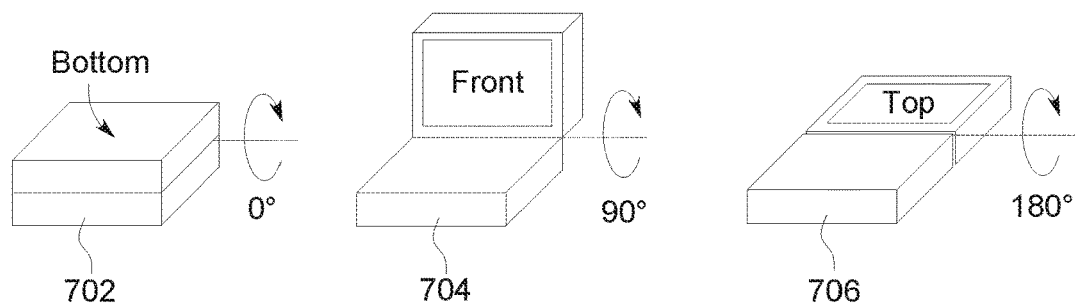
FIG. 7 is an exemplary block diagram illustrating cabinet adjacencies with rotational angles.

FIG. 7 is an exemplary block diagram illustrating cabinet adjacencies with rotational angles. When specifying cabinet panel adjacencies along edges to define hinge joints around which cabinets may rotate, it may be useful to define the rotational extents to provide a reference for the relative rotational angle. While this may be accomplished by specifying a maximum angle of rotation from 0-360°, this may impose a requirement of having to lay out reference cabinets in such a way that they are oriented to be at their 0° or maximum° rotational angle. This may present some complications for how the panel orientation maps to the default posture of the system enclosure. For example, in the case of a laptop enclosure with its default "open" posture having the lid cabinet rotated 90° from the main cabinet, as depicted by cabinet adjacency model 704, the lid panel containing the screen is defined as the front panel. However, if the lid cabinet began as rotated 0° from the main cabinet then the panel containing the screen would effectively become the bottom panel, as depicted by cabinet adjacency model 702. Likewise, if the lid cabinet were to start out rotated to its maximum angle, such as around 180°, then the screen would be on the top panel, as depicted by cabinet adjacency model 706. To address this, it would be useful to provide a way to specify the default rotation angle in addition to the maximum angle. However, it would have to be assumed that the 0° angle represents one cabinet folded on the other one such that their panels are perfectly parallel to each other, as further described in FIG. 8 below.

Figure 8:
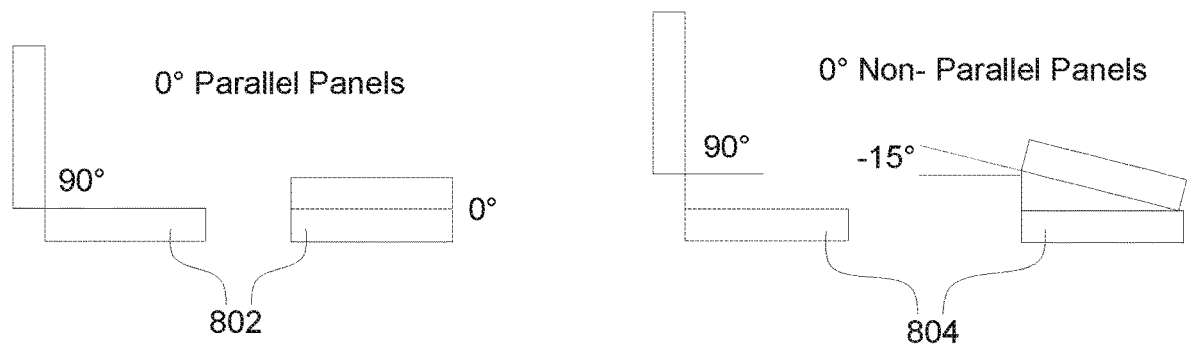
FIG. 8 is an exemplary block diagram illustrating cabinet adjacencies with default positional angles.

FIG. 8 is an exemplary block diagram illustrating cabinet adjacencies with default positional angles. Cabinet adjacency model 802 illustrates the 0° angle that represents one cabinet folded in on the other one such that their panels are perfectly parallel to each other. However, this is not always the case, especially if there is a positional gap offset between the cabinets that presents an opportunity for a hinge between cabinets to rotate inward beyond the point of being parallel, such as represented by cabinet adjacency model 804.

Figure 9:
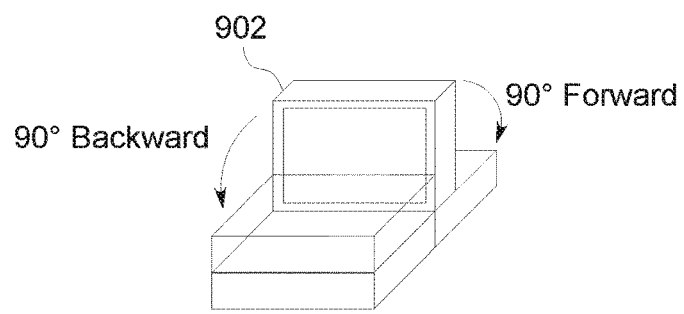
FIG. 9 is an exemplary block diagram illustrating cabinet adjacencies with default postural angles.

FIG. 9 is an exemplary block diagram illustrating cabinet adjacencies with default postural angles. Rather than performing complicated geometric calculations to determine the rotational reference for the 0° angle that the maximum hinge angle is relative to, an alternative approach is to treat the default posture angle as the reference angle and define the maximum angles that the hinge may rotate in both directions from that reference. That is, instead of defining the maximum hinge angle across the entire rotational space, and the default posture angle somewhere within that maximum hinge angle, the definition may be the maximum rotation angles in both directions from the default posture angle. For example, as illustrated by cabinet adjacency model 902, in the case of a laptop enclosure with its default "open" posture having the lid cabinet rotated 90° from the main cabinet, it may have an inner rotation of 90° to get it into the "closed" posture, as well as an outer rotation of 90° to open the lid to its maximum rotation, where adding the inner and outer rotations together gives the full rotational range of 180°. In other example scenarios, the outer rotation may exceed 90°, such as having the lid cabinet rotated 180° to meet the main cabinet on the opposing side from "closed" posture.

Figure 10A:
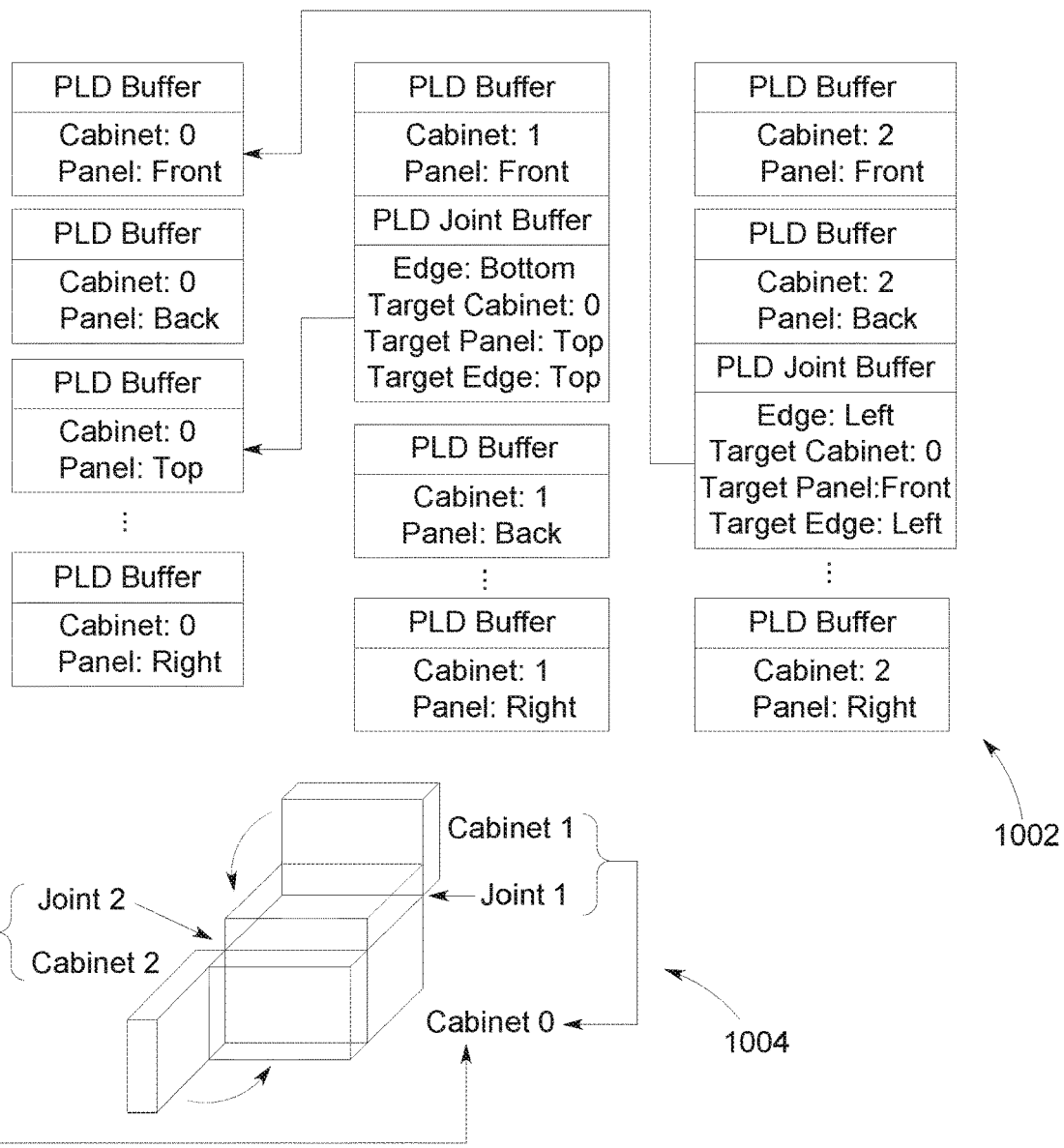
FIG. 10A is an exemplary block diagram illustrating reference panel Physical Location of Device (PLD) buffers.

FIG. 10A is an exemplary block diagram illustrating reference panel Physical Location of Device (PLD) buffers. The ACPI PLD descriptor does not provide any additional fields beyond the CabinetNumber field that may be reasonably repurposed or otherwise used to describe such adjacency information for cabinets, as described herein. However, the ACPI specification does outline an extensibility model for the PLD descriptor in the form of a set of custom OEM-specific buffers that may accompany the PLD descriptor. For example, the ACPI specification states that all additional buffer entries returned may contain OEM-specific data, but must begin in a {GUID, data} pair. This additional data may provide complimentary physical location information specific to certain systems or class of machines, according to the current ACPI standard.

Each pair of custom buffers is identified by a GUID and there are no practical constraints on the number of buffer pairs allowed in the PLD definition, so this mechanism is suitable for use as a way to effectively extend the PLD descriptor with custom fields. Each custom data buffer is constrained to 128-bits, which may be a factor to consider when determining how much adjacency information may be described per panel. However, since the ACPI specification does not indicate that each GUID must be unique, a possible option may include the specification of multiple custom buffers along with a single PLD descriptor. Different options for how to lay out the definitions of cabinet and panel adjacency information include: one adjacency per panel; one adjacency per panel edge, and multiple adjacencies per panel.

In the one adjacency per panel approach, flexibility is provided for defining unlimited adjacencies, while maintaining a fixed size overhead for each panel that is part of a cabinet adjacency definition. For example, this approach fits into a single custom buffer with plenty of room to specify other related adjacency attributes. Each panel defines which panel on a neighboring cabinet to attach its own cabinet to, rather than defining which panels are attached to it. Having a panel define its adjacency to another panel on a neighboring cabinet also provides an intuitive way to model multi-cabinet relations as joints that attach ancillary cabinets to primary or parenting cabinets as self-contained extensions that define their own relationships with their respective targets.

As such, a reference panel PLD descriptor may be extended with a PLD joint descriptor in order to describe how its source cabinet is joined by way of the source panel to a neighboring target panel on a target cabinet. Diagram 1002 provides a sample set of reference panel PLD buffers, populated with panel and location information, that describe an arbitrary three cabinet system enclosure 1004, where secondary source cabinets, cabinet-1 and cabinet-2, each independently join different target panels of the primary target cabinet-0 from different source panels.

The following data structure provides an exemplary definition for an illustrative format of a hypothetical PLD joint descriptor buffer, where the Panel and CabinetNumber fields of the reference panel PLD descriptor being extended are implicitly treated as the source panel and source cabinet number of the joint:

```
//
// ACPI PLD Joint Descriptor Buffer
//
typedef struct _ACPI_PLD_JOINT_BUFFER {
   UINT32 Revision:5;
   UINT32 JointType:4;
   UINT32 SourceEdge:3;
   UINT32 TargetCabinetNumber:8;
   UINT32 TargetPanel:3;
   UINT32 TargetEdge:3;
   UINT32 Reserved1:5;
   UINT32 MovementOrientation:1;
   UINT32 ForwardMovementRange:16;
   UINT32 BackwardMovementRange:16;
   UINT32 VerticalOffset:16;
   UINT32 HorizontalOffset:16;
   UINT32 GapOffset:16;
   UINT32 Rotation:9;
   UINT32 Reserved2:7;
} ACPI_PLD_JOINT_BUFFER, *PACPI_PLD_
   JOINT_BUFFER;
```

The fields in the PLD joint descriptor are used as follows:

| Field | Description |
| --- | --- |
| Revision | Data buffer revision |
| JointType | Identified type of joint, where:<br>0 - Fixed<br>1 - Planar<br>2 - Hinge<br>3 - Pivot<br>4 - Ball |
| SourceEdge | Describes which edge of this source panel is attached to the target cabinet, where:<br>0 - Top<br>1 - Bottom<br>2 - Left<br>3 - Right<br>4 - Unknown (Attach panel by its front face instead of an edge) |
| TargetCabinetNumber | Identifies the target cabinet number to attach this panel (and by extension its cabinet) with. Should not be the same cabinet number that this panel is part of. |
| TargetPanel | Describes which panel on the target cabinet to attach with, where:<br>0 - Top<br>1 - Bottom<br>2 - Left<br>3 - Right<br>4 - Front<br>5 - Back (Should not be used)<br>6 - Unknown (Should not be used) |
| TargetEdge | Describes which edge on the target panel to attach with, where:<br>0 - Top<br>1 - Bottom<br>2 - Left<br>3 - Right<br>4 - Unknown (Attach to front face of target panel instead of an edge) |
| MovementOrientation | Describes orientation of joint movement direction when a guiding target edge is not specified, where:<br>0 - Horizontal<br>1 - Vertical |
| ForwardMovementRange | Describes forward movement range of joint from its initial starting position based on its type, where:<br>Fixed - N/A<br>Planar - Positional translation range, forward to move joint to its maximum offset along its glide path.<br>Hinge - Clockwise rotation range, outward to open hinge to its maximum angle.<br>Pivot - Clockwise rotation range. |
| BackwardMovementRange | Describes backward movement range of joint from its initial starting position based on its type, where:<br>Fixed - N/A<br>Planar - Positional translation range, backward to move joint to its minimum offset along its glide path.<br>Hinge - Counter-clockwise rotation range, inward to close hinge to its minimum angle.<br>Pivot - Counter-clockwise rotation range. |
| VerticalOffset | Vertical offset of joint panel/edge from target panel origin. |
| HorizontalOffset | Horizontal offset of joint panel/edge from target panel origin. |
| GapOffset | Gap offset of joint panel/edge contact point from target panel, where 0 indicates that there is no gap. |
| Rotation | Rotates the joint clockwise around the origin of its source panel. Defined as 0-360°. |

Alternatively, a one adjacency per panel edge approach may be used to provide for a maximum of four adjacencies per panel when only considering edges, or six adjacencies per panel when additionally including the front and back sides of a panel. This approach may be fixed size, so it may still fit into a single custom buffer, however it may be somewhat constrained with regard to options for specifying related adjacency attributes. As yet another alternative approach, multiple adjacencies per panel could be described with each adjacency in its own custom buffer with plenty of room to specify other related adjacency attributes. For panel definitions on the main cabinet, this approach may potentially have constraints, such as having excessively large PLD definitions containing many buffers if many cabinets are all attached to a single panel.

With the formalization of the CabinetNumber field in the PLD descriptor as the primary method for distinguishing which cabinet a panel is associated to, the Lid field becomes marginalized if not obsolete. As such, there may be a desire to address potential compatibility concerns with pre-existing PLD definitions in legacy systems where the Lid field is used.

Any existing PLD definitions that use the Lid field to define panel relationships may be retrofitted into the multi-cabinet model by assigning all lid panels an extended/reserved CabinetNumber (e.g. 256, as it is outside of the allowed 0-255 range) and creating a PLD joint descriptor on the front reference lid panel that attaches it to the main cabinet as follows, for example:

JointType: Hinge
SourceEdge: Bottom
TargetCabinetNumber: 0
TargetPanel: Top
TargetEdge: Top
MovementOrientation: 0
ForwardMovementRange: 90

BackwardMovementRange: 90
VerticalOffset: 0
HorizontalOffset: 0
GapOffset: 0
Rotation: 0

While this approach should address compatibility concerns around mapping pre-existing PLD definitions for standard laptop form factor systems to the new multi-cabinet model, it should not actively do anything to prevent ACPI firmware authors from continuing to use the Lid field as a more explicit way to identify panels as being associated to laptop lids on the basis that pre-existing app software may already be using this field for its own purposes.

Figure 10B:
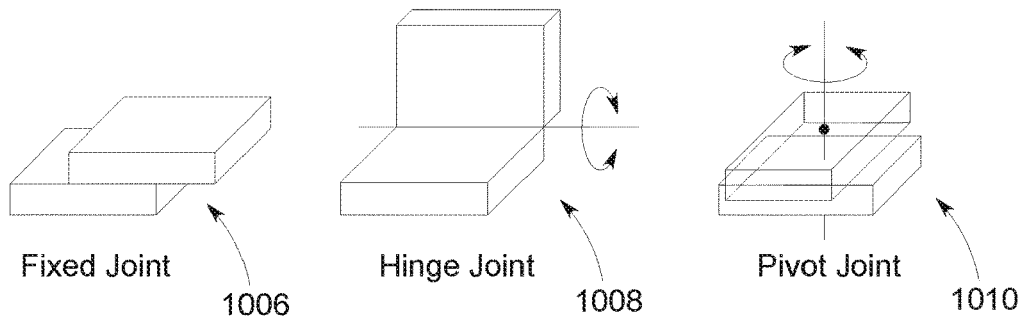
FIG. 10B is an exemplary diagram illustrating various joint relationships between cabinets.

FIG. 10B is an exemplary diagram illustrating various joint relationships between cabinets, which may be defined in the PLD joint descriptor field. Fixed joint 1006 may represent a joint relationship between two cabinets where the cabinets slide across a panel surface of each cabinet in a fixed direction along one plane or are fixed and/or fused in position. Hinge joint 1008 may represent a joint relationship between two cabinets where the rotation may be anywhere between the range of zero to 360°, such as in a laptop or ultrabook configuration for example. Pivot joint 1010 may represent a joint relationship between two cabinets with a fixed axis around which one or both cabinets may rotate along a single plane.

In some examples, the OS may detect an addition of at least one device or panel dynamically attached to the computer system and interrogate the additional device or panel to understand device capabilities as well as update system capabilities as a result of the addition. The OS may dynamically obtain a device schema for the detected addition, comprising device panel locations and adjacency relationship information, via a bus protocol of the system for example. As one non-limiting example, a computer system may have modular functionality, with a single cabinet such as a tablet form factor, capable of at least some different functionality when joined with a second cabinet. The device schema information may be used by the OS to update dynamic device properties (i.e. a dynamic schema) and provide for application development of different experiences on different form factors without having to specify each particular experience and form factor relationship.

Figure 11:
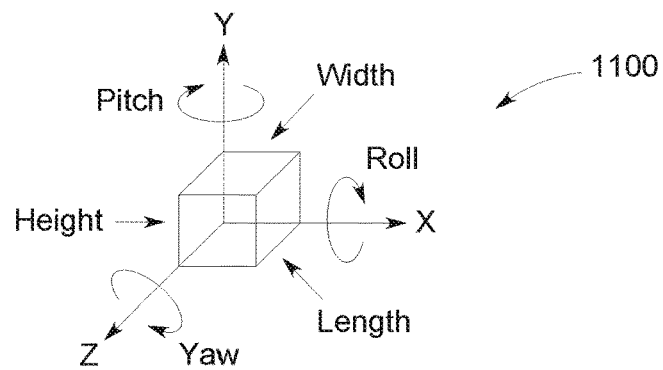
FIG. 11 is an exemplary diagram illustrating cabinet descriptors for three-dimensional positional offsets.

FIG. 11 is an exemplary diagram illustrating three-dimensional cabinet attributes for spatial positioning, dimensions, and orientation. In order to be able to fully describe the location of a device relative to a panel, it is sometimes necessary to be able to define its X, Y, and Z positional offsets, as well as its yaw, pitch, and roll spatial orientation in 3D space, as represented by diagram 1100. For example, it may be useful to describe how far beneath the surface of a panel an internal device is mounted, as well as its fixed orientation at its mounted position. In other situations, it may also be necessary to define the width, height, and length of a device in 3D space. For example, it may be useful to describe the length and/or depth of a drive bay or the complete dimension of the device in that drive bay.

While some common scenarios only require knowing the location of devices within their enclosure, or relative to one another (same/opposite panel), other modern systems may be equipped with sensor devices that may infer information about the physical world that the device and/or its physical enclosure interact with, and that may also be interesting for certain scenarios. In each of these cases, the relationships are derived from information about the relative panel location of such a device and some additional environmental input.

For example, one type of sensory input data that may be used to create a type of spatial relationship between a device and the physical world outside it is the directional orientation of the device. Combined with information about how the device is located relative to the enclosure, this may create additional meaningful relationships between devices and the system enclosure.

The knowledge of how a device is positioned relative to the physical world may provide a new reference for describing panels and devices. For example, when a tablet or phone device is laid flat on a surface, the "front facing" display device may additionally be described as "upward-facing", while the "rear-facing" camera would additionally be described as "downward-facing", relative to the current absolute direction of the fixed panels that each are located on.

Just as the panel-relative relationships may be derived from a device's panel location, a device's directional relationship to the physical world is simply a transform of that panel location which takes the current directional position of the enclosure into consideration, as informed by live data from some orientation sensor device for example.

As one illustrative example, if the orientation sensor shows the system has been laid flat then the front panel of the enclosure (i.e. the display) is facing up. Scenario requirements may inform whether it is important to generalize the mechanism for inferring directional relationships or provide an established pattern for applications and system components to discover these directional relationships.

In other situations, it may also be desired to define the width, height, and length of a device in 3D space, as discussed in FIG. 11. The PLD descriptor currently only provides fields for defining the following spatial attributes in 2D space, for example:

Width: Width of device
Height: Height of device
HorizontalOffset: X offset of device
VerticalOff set: Y offset of device
Rotation: Yaw/Z rotation of device A custom PLD data buffer may be used to supplement the PLD descriptor in order to describe the missing spatial attributes. While this custom data buffer may contain just the missing Length, Z, Pitch, and Roll fields, it might seem somewhat incoherent or patchy to have these tightly related fields spread across multiple buffers. Instead it might be more appropriate to have all related fields defined together in a single new buffer, such that the duplicate fields in the custom descriptor extensions supersede those in the PLD descriptor. The PLD Rotation field only provides the ability to specify rotation in increments of 45°, so a new descriptor may also remedy that by providing more precision.

The following data structure is an exemplary definition of an illustrative format of a hypothetical PLD spatial descriptor buffer, populated with panel and location information:

```
//
// ACPI PLD Spatial Descriptor Buffer
//
typedef struct __ACPI_PLD_SPATIAL_BUFFER {
    UINT32 Revision:5;
    UINT32 RollRotation:9;
    UINT32 PitchRotation:9;
    UINT32 YawRotation:9;
    UINT32 Width:16;
    UINT32 Height:16;
    UINT32 Length:16;
    UINT32 HorizontalOffset:16;
```

```
        UINT32 VerticalOffset:16;
        UINT32 DepthOffset:16;
    } ACPI_PLD_SPATIAL_BUFFER,
      *PACPI_PLD_SPATIAL_BUFFER;
```

The fields in the PLD spatial descriptor are used as follows:

| Field | Description |
| --- | --- |
| Revision | Data buffer revision. |
| RollRotation | Roll/X rotation of device around its origin. Defined as 0-360°. |
| PitchRotation | Pitch/Y rotation of device around its origin. Defined as 0-360°. |
| YawRotation | Yaw/Z rotation of device around its origin. Defined as 0-360°. |
| Width | Width of device on panel. |
| Height | Height of device on panel. |
| Length | Length of device under panel surface. |
| HorizontalOffset | Horizontal/X offset of device from panel origin. |
| VerticalOffset | Vertical/Y offset of device from panel origin. |
| DepthOffset | Depth/Z offset of device from panel surface. Represents how far device is mounted beneath panel surface, unless PLD.UserVisible = 1 then it represents how far device extends above panel surface. |

In the event that there is a need to represent larger dimensions or increase precision of rotations, there may be a need to split the spatial field across additional data buffers given that each custom buffer is constrained to 128-bits. An alternative approach could be to partition the dimension, offset, and rotation fields into their own respective data buffers, each with plenty of space for larger values. In fact, with 32-bits per field, floating point values become an option, in particular for rotations. For example:

```
//
// ACPI PLD Dimension Descriptor Buffer
//
typedef struct _ACPI_PLD_DIMENSION_BUFFER {
    UINT32 Revision:8;
    UINT32 Width:32;
    UINT32 Height:32;
    UINT32 Length:32;
    UINT32 Reserved:24;
} ACPI_PLD_DIMENSION_BUFFER,
  *PACPI_PLD_DIMENSION_BUFFER;
//
// ACPI PLD Position Descriptor Buffer
//
typedef struct _ACPI_PLD_POSITION_BUFFER {
    UINT32 Revision:8;
    UINT32 HorizontalOffset:32;
    UINT32 VerticalOffset:32;
    UINT32 DepthOffset:32;
    UINT32 Reserved:24;
} ACPI_PLD_POSITION_BUFFER,
  *PACPI_PLD_POSITION_BUFFER;
//
// ACPI PLD Rotation Descriptor Buffer
//
typedef struct _ACPI_PLD_ROTATION_BUFFER {
    UINT32 Revision:8;
    UINT32 RollRotation:32;
    UINT32 PitchRotation:32;
    UINT32 YawRotation:32;
    UINT32 Reserved:24;
} ACPI_PLD_ROTATION_BUFFER,
  *PACPI_PLD_ROTATION_BUFFER;
```

Figure 12:
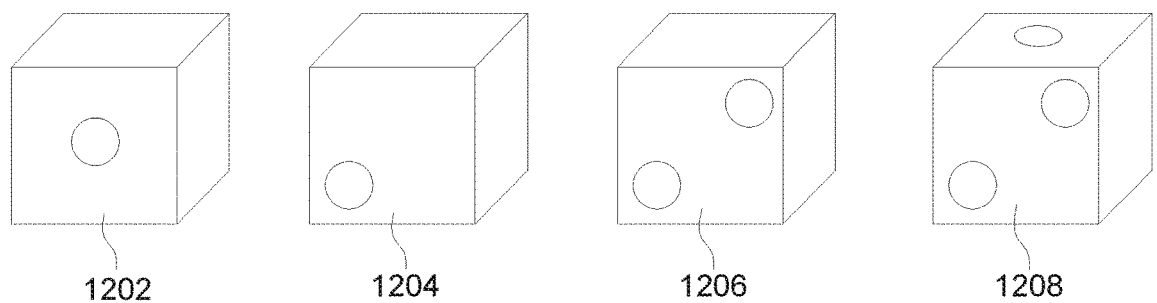
FIG. 12 is an exemplary block diagram illustrating device panel locations.

FIG. 12 is an exemplary block diagram illustrating device panel locations. A panel location may be used to describe where a device is located, relative to its enclosure. For example, a device may be located on the "front panel" of the system, such as depicted by device panel location 1202. While not utilized by every scenario, it may be useful to understand the absolute or relative size, placement, and orientation of a device on its panel. This may help further identify (or constrain) the spatial relationship that a selected device has to its enclosure. For example, a device may be located on the "bottom-left of the front panel" as depicted by device panel location 1204. Some scenarios for this type of location information may be to identify a location of a camera on a panel of a tablet, for example.

In addition to providing the ability to describe devices that are located on the exterior of the rectangular panels of their enclosure, the examples herein further enable description of non-user visible devices that may be located within the interior of an enclosure, which may be considered to be on 'no panel' of the enclosure, further addressed in FIG. 14 below.

Panel-relative relationships may be derived from panel location information of devices within the same enclosure group. This relationship describes how two devices relate to each other, relative to the panels that they are each located on. This information is typically used for the purposes of identifying a collection of devices that are intended to work together to accomplish some scenario. This type of relationship is often used to find other devices that are on the same panel as some other reference device as well. For example, as illustrated by device panel location 1206, two devices on the same panel may provide one or more opportunities to work together for particular experiences. Some exemplary scenarios may include a system that automatically pairs the display panel with the tough digitizer that overlays it, or display brightness being influenced by the ambient light sensor (ALS) mounted on the same panel as the display, for example.

There may also be scenarios where the desired device is on some other panel, relative to the panel of some reference device. A device may have a relationship with other devices that are on the panels adjacent to, or opposite from the device's own panel, such as depicted in device panel location 1208.

Figure 13:
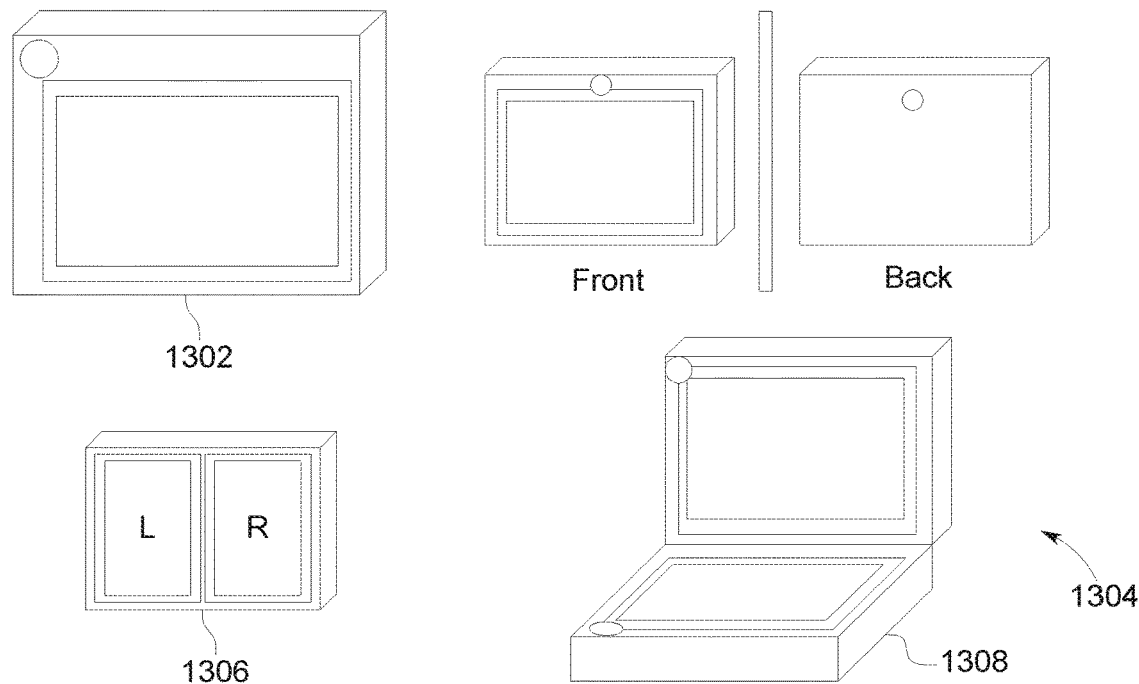
FIG. 13 is an exemplary block diagram illustrating device panel location scenarios.

FIG. 13 is an exemplary block diagram illustrating various device panel location scenarios. Panel location 1302 illustrates an example where two devices are associated with the same panel, and may work together to accomplish one or more scenarios, such as an ambient light sensor and display mounted on the same panel working together to control display brightness based on ambient lighting detected.

Panel location 1304 depicts a cabinet or enclosure where a relationship between a device on one panel and a device on another panel is affected relative to a third device. For example, a camera application would select a camera device that is on an opposite panel from the display panel of a tablet for the purposes of taking a distance photo. Conventionally, this is referred to as a "rear-facing" camera, but the implied relation for this scenario is actually that the camera is on the rear panel of the enclosure relative to the panel of the display monitor device on which the application is currently being displayed, which may be on the front panel of the enclosure in one example. However, if the display panel on a rear panel of the enclosure becomes the display panel on which the application displays, the conventionally identified "front-facing" camera, or the camera implemented on the opposing panel of the enclosure from where the application is currently being displayed, may be employed for taking a distance photo.

While this example of selecting an appropriate camera has an intended scenario implied, that same application may also select the camera on the same panel as the display for the purpose of taking a self-portrait or "selfie". Both scenarios require the application to find some camera device with a relationship to that same display device, but the related device is different in each case, depending on the scenario requirements.

A computing system may include any number of devices having any number of classes. The operating system of a computing system provides software APIs as part of a higher-level software abstraction for devices on the computing system. These APIs include class definitions for commonly used classes of devices. The class definitions provide class-specific methods as well as generic methods that many different classes of devices may implement.

An API may be used to enumerate different classes of device objects, such as, for example, functional device instances, device interfaces, device panels, and query and/or filter on their properties and other attributes.

As one example, a structured query language may reference objects of different classes, and their class-specific attributes and/or properties, in order to gather or select devices that match specific criteria. For example, a class object may be referenced along with a class-specific method for an application to build a query that will filter the selection of devices for that class, based on discoverable device properties. In this example, the query may be used by applications for the discovery and notification about devices that are connected to the system, and to retrieve a collection of devices that meet the desired selection criteria of the referenced class object.

By providing a device query, the caller is removed from the responsibility of knowing how to collect devices for that class. Devices that may be used by some device class implementation may actually span several device categories. Future devices with fundamentally different attributes (but still handled by the class implementation) may be included in a class membership without having to modify the applications at all. The selection criteria for devices in that class may be updated to apply new constraints, based on new scenarios, and that may occur independently of the callers.

While the selection criteria for the collection of devices returned by a query is largely opaque to callers, the application itself explicitly selects which device(s) from the collection to use. The caller may inspect the devices in the returned collection using general device information object properties. The application may eventually instantiate the desired device as an object of the selector's class using a method to allow for the functionality of that class to be used.

One example where an application may perform some further inspection of the devices returned in a collection is to evaluate the location of the devices. Some physical location attributes of devices are also made directly available to application developers. These attributes are available for any device the system OEM has specified _PLD information for in the system ACPI table, as described above. When present, such information is made available through an abstracted enclosure location property collection on a device information object. Any existing and new attributes/properties defined in PLD descriptor or one of its custom extended may be surfaced through such abstracted properties. Likewise, any similar device enclosure location information described in PLD-like descriptor provided from different sources that have affinity with specific device instances may be mapped to their respective enclosure location abstractions. Such an abstraction provides the application level with a consistent scheme for working with device location information without having to understand the underlying device/firmware-specific descriptor format, such as PLD or otherwise.

An application developer may use this enclosure location information, which includes panel information, to understand the absolute panel location of a device, such as Front panel or Back panel. An application may also use this information to infer the panel-relative relationship between two devices by comparing values associated with each of the enclosures of a system, such as a lid enclosure and a base enclosure of a laptop system, in one non-limiting example.

For most scenarios, discovering a panel-relative relationship between devices provides for a way to find devices that are "related" to each other. In those device relationships, the display monitor may be a common reference device because of the natural affinity that application experiences have to it. While the display device is a common reference point however, different types of panel-relative relationships may be meaningful for different classes of devices, for different scenarios. For example, while the "display brightness" scenario requires an ambient light sensor (ALS) that is on the same panel as the display, a high-resolution photography scenario typically requires a camera that is on the opposite panel from the display. As such, the different types of spatial relationships may not be over-generalized into simple "group" abstractions.

How the relative orientation of two devices defines a group is dependent on the scenario for which they are being used. While some spatial relationships may be used to automatically generate groups that are broadly useful, the detailed spatial information about how devices relate to their enclosure is exposed directly by the platform. This allows OS components and applications to build their own "groups" for unique scenarios, which may contain only certain device classes, with unexpected relationships.

The ACPI PLD information may also be leveraged to more accurately describe the enclosure-relative panel locations of multiple display and/or touch input devices. In some examples, multiple devices on the same panel, as depicted in panel location 1306, may be associated by further correlating the rough _PLD values for vertical position (Upper, Center, Lower) and horizontal position (Left, Center, Right), or the more precise _PLD location information for shape, vertical offset, and horizontal offset. For example, the data structure for panel location 1306 may be:

Display #1 ContainerID={PC}, Lid=0, Panel=Front, Horizontal=Left
Display #2 ContainerID={PC}, Lid=0, Panel=Front, Horizontal=Right
Touch #1 ContainerID={PC}, Lid=0, Panel=Front, Horizontal=Left
Touch #2 ContainerID={PC}, Lid=0, Panel=Front, Horizontal=Right In an example where this location information is specified by the OEM using the ACPI _PLD descriptors, the display and input stacks would have the information to evaluate the location of each device and how they are related to each other.

As another example, illustrated by panel location 1308, a laptop system may have display devices on a lid cabinet and a base cabinet. In addition to existing checks to make sure that input and display devices are grouped in the same container, by way of having the same Container ID, these stacks may also query and use the _PLD enclosure information in order to associate integrated devices based on each having the same Lid+Panel information in the PC enclosure. For example, the data structure for panel location 1308 may be:

Display #1 ContainerId={PC}, Lid=1, Panel=Front
Display #2 ContainerId={PC}, Lid=0, Panel=Top
Touch #1 ContainerId={PC}, Lid=1, Panel=Front
Touch #2 ContainerId={PC]}, Lid=0, Panel=Top
Light Sensor #1 ContainerId={PC}, Lid=1, Panel=Front
Light Sensor #2 ContainerId={PC}, Lid=0, Panel=Top While these comparisons may be done directly by any application or system components, a set of methods provided by the OS may help 'resolve' the independent locations of devices into relationships. This will aid applications in correctly accounting for new, unique form-factors of the system chassis as well as the dynamic nature of relationships, as influenced by current system "postures."

While support for multiple integrated displays with touch capabilities, and the like, require knowledge of devices within the PC, this is achievable with Container IDs. However, to determine which devices are co-located on the same panel requires knowledge of panel locations, which may be realized by leveraging the ACPI PLD descriptor for these devices. Display and Input device stacks may now leverage both Container ID information and ACPI PLD-based enclosure location information (for devices inside the PC) to correlate devices.

Figure 14:
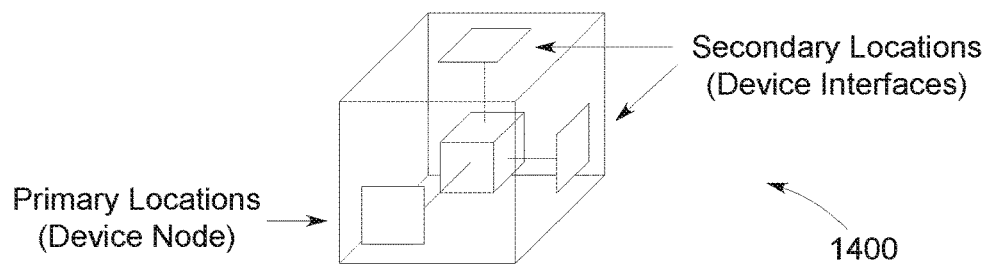
FIG. 14 is an exemplary block diagram illustrating an individual device node having affinities with multiple panels or panel locations.

FIG. 14 is an exemplary block diagram illustrating an individual device node having affinities with multiple panels or panel locations. Diagram 1400 illustrates how multiple ACPI PLD custom buffer descriptor extensions may be used by a system where a device node has affinity with more than one panel, by way of the multiple device interface endpoints it may expose to the OS for different functions.

For most practical purposes, a device is primarily associated with a single panel. However, in some examples a device node may have affinity with multiple panels or even multiple positions on a single panel, in particular along functional boundaries where each individual function may require its own locational awareness. Multiple such functional endpoints are often exposed as subordinates of a single device node in the form of device interfaces. For example, a single sensor core device may implement multiple sensor types, each exposed through its own device interface, where an individual sensor probe may tap into the sensor core at some arbitrary internal location, while being mounted at a different distinct fixture location on the panel. Similarly, a single audio device may implement multiple audio input/output endpoints that each require their own distinct locational awareness as their connection points are mounted at different panel locations.

Since a device interface could benefit from having its own complete PLD descriptor beyond the primary PLD descriptor of the device node that it is subordinate to, examples herein provide the ability to specify multiple PLD descriptors per device, as well as being able to associate these secondary PLD descriptors with their target device interfaces.

A device interface instance is identified by its parent device instance ID, an interface class GUID, and an optional interface reference ID to disambiguate multiple interface instance siblings using the same interface class GUID. A custom PLD data buffer may be used to accompany a secondary PLD descriptor in order to describe the device interface that it should be associated to. Since a device interface is represented as a standalone object in the PnP device platform object model with its own set of properties, it may maintain its own secondary PLD descriptor separate from the primary PLD descriptor maintained by its parenting device instance.

A device instance ID is a parent device node/instance that interface belongs to, where the relationship between the parent device instance and its child device interfaces is implied by way of the device interface registration mechanism that operates against a device instance. An interface class GUID is a 128-bit GUID identifying class/type of device interface. An interface reference ID, which may be a string or a GUID, is an optional, vendor-defined reference ID used to distinguish multiple instances of an interface that belong to the same interface class. The only requirement on this reference ID is that it is unique among all other reference IDs for the same interface class GUID under the same parenting device instance. In practice drivers tends to use short reference ID strings (e.g. "wave" for an audio output interface that renders waveform audio data), or GUIDs as a more foolproof approach to guarantee uniqueness. Unfortunately, due the limitation of an ACPI PLD custom data buffer being only 128-bits, an interface reference ID specified as a string would have a maximum length constrained to 8 characters when expressed as Unicode, or 16 characters when expressed in ANSI/ASCII, where a zero-terminator character is optional for minimal length strings. Naturally, an interface reference ID represented as a 128-bit GUID fits into the PLD custom buffer as-is without any compromise and may later be converted to a string at runtime as needed by the OS for interface registration.

The following data structures provide exemplary definitions for illustrative formats of a hypothetical set of PLD interface descriptor buffers:

```
//
// ACPI PLD Interface Class/Instance Descriptor Buffers
// (stored in _PLD custom data buffer, fixed size of 128-bits)
//
typedef struct _ACPI_PLD_INTERFACE_CLASS_BUFFER {
    GUID ClassGuid;
} ACPI_PLD_INTERFACE_CLASS_BUFFER,
*PACPI_PLD_INTERFACE_CLASS_BUFFER;
typedef struct
_ACPI_PLD_INTERFACE_INSTANCE_UNICODE_BUFFER {
    WCHAR ReferenceString[8];
} ACPI_PLD_INTERFACE_INSTANCE_UNICODE_BUFFER,
*PACPI_PLD_INTERFACE_INSTANCE_UNICODE_BUFFER;
typedef struct
_ACPI_PLD_INTERFACE_INSTANCE_ANSI_BUFFER {
    CHAR ReferenceString[16];
} ACPI_PLD_INTERFACE_INSTANCE_ANSI_BUFFER,
*PACPI_PLD_INTERFACE_INSTANCE_ANSI_BUFFER;
typedef struct
_ACPI_PLD_INTERFACE_INSTANCE_GUID_BUFFER {
    GUID ReferenceGuid;
} ACPI_PLD_INTERFACE_INSTANCE_GUID_BUFFER,
*PACPI_PLD_INTERFACE_INSTANCE_GUID_BUFFER;
```

The fields in the PLD interface descriptors may be used as follows:

| Field | Description |
| --- | --- |
| ClassGuid | Interface class GUID. |
| ReferenceString | Optional interface reference ID as a string. Maximum 8 characters for Unicode or 16 characters for ANSI, where zero terminator is optional. |
| ReferenceGuid | Optional interface reference ID as a GUID. |

The actual propagation of such device interface PLD descriptors onto the desired target device interfaces may be done from the ACPI driver or some underlying OS mechanism in order keep it generic for all devices, although it may also be supplemented by specific driver configured on the device as part of its own device interface processing.

The ACPI specification outlines support for querying PLD objects with the following layouts, both of which only allow for a single PLD object to be defined per device node:

I. Single Buffer:

```
Name(_PLD,
    Buffer(0x14) {
        0x02,  0x10,  0x20,  0x30, 0x34, 0x12, 0x78, 0x56,
        0x65,  0x1D,  0x00,  0x00, 0x00, 0x00, 0x00, 0x00,
        0xFF,  0xFF,  0xFF,  0xFF
})
```

II. Package containing single buffer:

```
Name(_PLD,
    Package(0x1) {
        Buffer(0x14) {
            0x02, 0x10,  0x20, 0x30, 0x34, 0x12, 0x78, 0x56,
            0x65, 0x1D,  0x00, 0x00, 0x00, 0x00, 0x00, 0x00,
            0xFF, 0xFF,  0xFF, 0xFF
        }
})
```

In order to define multiple reference panel PLD descriptors within the constraints of the current ACPI specification, the firmware author may choose to spread the required PLD descriptors across a set of unique device nodes. This is not a particularly practical approach as there may not be enough arbitrary device node among which to spread the required set of PLD descriptors, nor would the device nodes that hold these descriptors necessarily have any location-wise affinity with those device nodes. Instead it may be more intuitive to have multiple reference panel PLD descriptors stored against an individual device node, which could be selected more appropriately based on its affinity to the cabinet that it resides in.

For example, the ACPI root _SB_device node for a typical laptop system could hold all six reference panel PLD descriptors for the main cabinet, in the illustrative example of a cuboid cabinet, while a device node more closely tied to the lid cabinet, like the display adapter or monitor, could hold those descriptors. As such, it should be possible to store reference and non-reference panel PLD descriptors against a single device node for flexibility.

The ACPI PLD descriptor definition scheme and ACPI specification and related bus driver implementations may be extended to support multiple descriptors per PLD node using a layout scheme with nested packages, for example, as follows:

```
Name(_PLD,
    Package(0x6) {
        Package(0x1) {
            Buffer(0x14) {
                0x02, 0x10,  0x20, 0x30, 0x34, 0x12, 0x78, 0x56,
                0x65, 0x1D,  0x00, 0x00, 0x00, 0x00, 0x00, 0x00,
                0xFF, 0xFF,  0xFF, 0xFF
            }
        },
        Package(0x1) {
            Buffer(0x14) {
                0x02, 0x10,  0x20, 0x30, 0x34, 0x12, 0x78, 0x56,
                0x65, 0x1D,  0x00, 0x00, 0x00, 0x00, 0x00, 0x00,
                0xFF, 0xFF,  0xFF, 0xFF
            }
        },
        ...
        Package(0x1) {
            Buffer(0x14) {
                0x02, 0x10,  0x20, 0x30, 0x34, 0x12, 0x78, 0x56,
                0x65, 0x1D,  0x00, 0x00, 0x00, 0x00, 0x00, 0x00,
                0xFF, 0xFF,  0xFF, 0xFF
            }
        }
})
```

Within the device object model of the OS, each reference panel PLD descriptor may be stored in a "PLD Panel <panel side>" device property that is distinguished by its panel side, while a non-reference location PLD descriptor is simply stored in a "PLD Location" device property.

| PLD.Panel | PLD.Reference | Device Property |
|---|---|---|
| <any> | 0 | PLD Location |
| Top | 1 | PLD Panel Top |
| Bottom | 1 | PLD Panel Bottom |
| Left | 1 | PLD Panel Left |
| Right | 1 | PLD Panel Right |
| Front | 1 | PLD Panel Front |
| Back | 1 | PLD Panel Back |

The ACPI bus driver implementation could also be extended to recognize the new hypothetical ACPI_PLD_JOINT_BUFFER definition and other such custom data buffers, which would be defined under a PLD object as follows:

```
Name(_PLD,
    Package(0x6) {
        Package(0x1) {
            // ACPI_PLD_BUFFER
            Buffer(0x14) {
                0x02, 0x10,  0x20, 0x30, 0x34, 0x12, 0x78, 0x56,
                0x65, 0x1D,  0x00, 0x00, 0x00, 0x00, 0x00, 0x00,
                0xFF, 0xFF,  0xFF, 0xFF
            },
            // ACPI_PLD_JOINT_BUFFER_GUID
            Buffer(0x10) {
                0x8e, 0x90,  0x25, 0x53, 0x49, 0x40, 0x43, 0x2e,
                0xb0, 0x6a,  0x7e, 0xec, 0xe4, 0xbb, 0x38, 0xfd
            },
            // ACPI_PLD_JOINT_BUFFER
            Buffer(0x10) {
                0x01, 0x00,  0x40, 0x23, 0x00, 0x00, 0x00, 0x00,
                0x00, 0x00,  0x00, 0x00, 0x00, 0x00, 0x00, 0x00
            },
        },
    },
    . . .
```

Like with the reference panel PLD descriptors, each reference panel PLD joint descriptor may be surfaced through a "PLD Joint <panel side>" device property based on the specific reference panel PLD descriptor that it extends, for example, as follows:

| PLD.Panel | Device Property |
|---|---|
| Top | PLD Joint Top |
| Bottom | PLD Joint Bottom |
| Left | PLD Joint Left |
| Right | PLD Joint Right |
| Front | PLD Joint Front |
| Back | PLD Joint Back |

The expectation would be that there are no duplicate reference panel descriptors within a PLD object, so if they did occur then it would be considered a firmware authoring error and it would be reasonable to leave the behavior undefined or to only honor the first descriptor that occurs for each reference panel, discarding any duplicates.

In the event that the need to store each set of cabinet reference panel PLD descriptors across multiple device nodes is non-intuitive or otherwise problematic, an alternative approach may be employed to allow for multiple cabinets to all be defined under a single device node, such as the aforementioned ACPI root_SB_device node. Instead of constraining device properties to a fixed set of pre-defined properties, such as "PLD Panel <panel side>" and "PLD Joint <panel side>", a more dynamic device property assignment scheme may be utilized by simply having an open-ended sequenced set of device properties, such as "PLD Panel <sequence index>" and "PLD Joint <sequence index>". Of course, with such a scheme it may be necessary for consumers to examine the PLD data of each property in order to find ones related to specific reference panels and cabinet numbers or interest.

In order to abstract the format of device location/panel descriptor information reported by different bus drivers, as supplied to them by their respective firmware-specific implementations and descriptor formats, such as ACPI PLD with custom buffer extensions or USB firmware with MSOS (Microsoft® OS) extension descriptors, a common bus-agnostic descriptor may be introduced. Such a common device panel/location descriptor should be able to describe all relevant device location and panel information consumed from the ACPI PLD descriptor, including the aforementioned custom PLD descriptor extensions. Taking, for example, a buffer that abstracts the contents of the PLD and other theoretical bus-specific descriptors with similar location and/or panel information. The goal of such a common device panel/location descriptor is to formalize a lower-level driver-to-kernel interface for describing panels and/or device location information directly to the device platform without the need for any intermediate storage of ACPI PLD descriptors in "PLD Panel" properties. Instead the ACPI bus driver would map the relevant fields of any discovered PLD descriptors into device panel descriptors and report them directly to the device platform where they may be immediately synthesized into device panel objects and bus-agnostic device location properties. Once established, the device panel descriptor reporting interface may be implemented by other bus drivers in order to utilize the unified device panel model.

While the device panel descriptor itself may be stored as a device property, another approach is to split the device panel descriptor fields up into individual device properties, each with their own data types and presence as an indicator that they are actually supplied and valid. Additionally, any future revisions/extensions will simply result in new properties being added.

The following illustrative example provide exemplary definitions for a hypothetical device panel descriptor, such as a PnP device panel descriptor:

```
//
// PnP Device Panel Descriptor
//
typedef struct _PNP_DEVICE_PANEL_DESCRIPTOR {
    USHORT   Size;
    USHORT   Version;
    UINT32   Panelside;
    UINT32   PanelGroup;
    UINT32   Reference:1;
    UINT32   Visible:1;
    UINT32   Reserved:30;
    UINT32   Color;
    UINT32   Width;
    UINT32   Height;
    UINT32   Length;
    UINT32   PositionX;
    UINT32   PositionY;
    UINT32   PositionZ;
    UINT32   RotationX;
    UINT32   RotationY;
    UINT32   RotationZ;
    ...
} PNP_DEVICE_PANEL_DESCRIPTOR,
 *PPNP_DEVICE_PANEL_DESCRIPTOR;
```

Here, the PnP driver model may provide an interface through which a driver may report multiple PnP device panel descriptors that the driver has remapped from its own bus and/or device-specific descriptors, for example.

Figure 15:
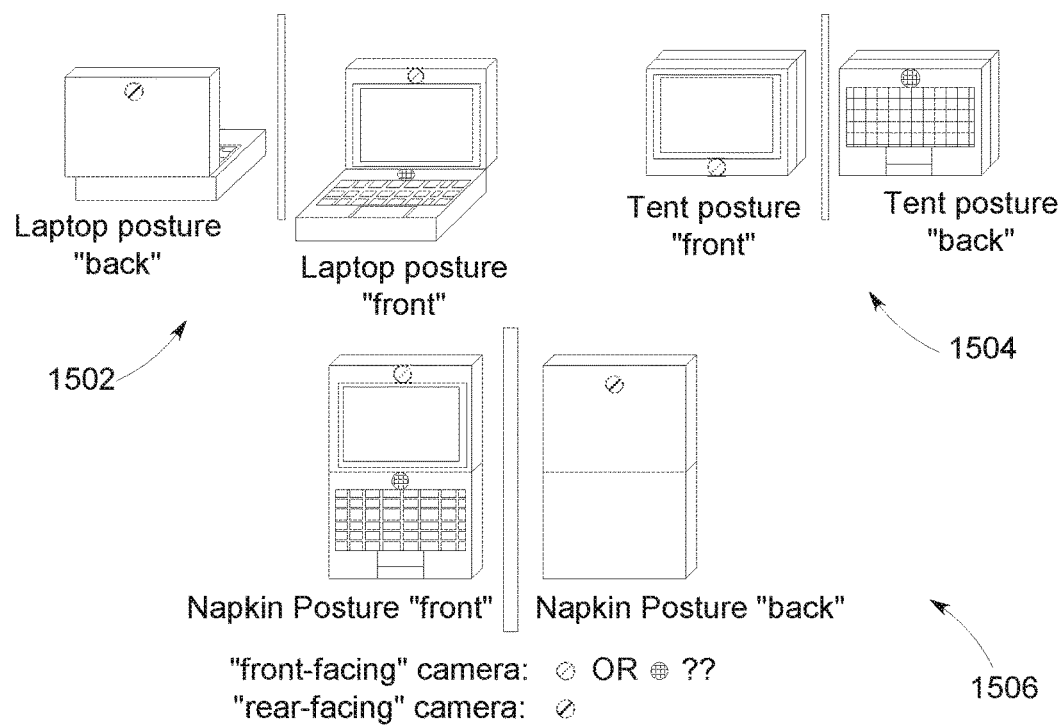
FIG. 15 is an exemplary block diagram illustrating posture influenced panel-relative relationships.

FIG. 15 is an exemplary block diagram illustrating posture influenced panel-relative relationships. Current PC form-factor devices that contain integrated cameras (such as tablets, laptops, and phones), typically contain at most two cameras. Because these systems also contain only one display device, and the display is assumed to be on the "front" of the system chassis, the well-known "front-facing" and "rear-facing" camera monikers map exactly to the "front" and "back" panel locations of these well-known system chassis form-factors.

However, the emergence of new system categories, such as convertibles or detachables, with innovative form-factors presents the possibility that certain "panel relative" relationships may be influenced by the current shape, configuration, or "posture", of the system chassis. For example, when a convertible laptop is in a traditional "laptop" posture, the panel that is opposite the front-facing display of the lid is the back of the lid. However, the ability to open the hinge of a convertible laptop all the way to 360 degrees may allow the base and lid panel groups of the laptop to align completely, as if they were now a single panel group. In this "tablet" posture, the panel that is "opposite" the front-facing display of the lid is actually the top of the base (where the keyboard traditionally resides). When the laptop is opened only half way, both the front of the lid and the top of the base are both facing the same direction.

Just as a "directional" relationship is derived from a device's panel location and information from an orientation sensor, a "posture-influenced" relationship may be derived from the panel location of devices and information from sensors, such as angle sensors and orientation sensor.

Although applications may query device panel location information to make an explicit decision about which panel the desired camera is expected to reside on, it is done with an implied dependency that it is relative to the display on the front panel. As form-factors evolve, systems are likely to include additional displays or cameras. Again, the example system chassis for a "convertible" laptop with multiple cameras, and a hinge that allows the lid to open a full 360°, as one example. As another example, two separate tablet-like computing devices may each separately have one display on one side of the device and may be coupled together (e.g. side-by-side, top-to-bottom, back-to-back, etc.) to provide a system chassis that now includes two potential displays, presenting different capabilities, user and/or application experiences, and system understanding of user input relative to the individual displays when each device is operating in a stand-alone configuration. In one illustrative example, where two devices are coupled together side-by-side and form an updated system chassis, the display area may now be doubled, and an application executing on the system may obtain the dynamic device properties to adjust the presentation of a GUI or other display element according to the current dynamic display parameters, or interpret a user input gesture (e.g. stylus, touch, hover, etc.) based on the updated dynamic device properties that impact both positionally and directionally an understanding of user interaction with a display element represented by the system in its current configuration.

In still other examples, the addition or integration of separate devices into a common system configuration may present different device component interactions, system capabilities, and application experiences. In one illustrative example, two individual computing devices each having two integrated camera devices may provide a system with four cameras when the two devices are joined together in some temporary form factor configuration. For example, two smart phone devices may be joined back-to-back to present a user experience or application experience, where an application executing on one or both of the smart phone devices obtains the dynamic device properties of the system in the joined configuration to understand the cameras that have current visibility and the cameras that are currently obscured.

Referring again to the figures, when the system chassis is in a standard "laptop" posture, such as depicted in posture 1502, the camera on the back panel of the lid may be considered the "rear-facing" camera. When the hinge is opened fully such that the system is in a "tent" posture (resembling a "tablet"), such as in posture 1504, the camera on the back panel of the lid is now obscured. The camera on the top panel of the base (with the keyboard) may now be considered the "rear-facing" camera for any application running on the display.

While OEM systems may accurately describe the panel locations of all three cameras using the PLD information, it is no longer sufficient for applications to explicitly check for a camera on the "Back" panel and consider it to be the "rear-facing" camera, relative to the application. In the scenario described above, when the system is in the "tent" posture, the rear-facing camera relative to the application's current view is actually the camera on the "Top" panel of the Lid.

Other postures, such as the 180° open flat "napkin" posture, such as posture 1506, introduce additional changes to what may be most desired by an application. When the system is in the "napkin" posture, as in posture 1506, it is reasonable to consider that the system has two "front-facing" cameras—one of which was considered "rear-facing" for a different posture of the same device in another scenario.

Because the current patterns for selecting a camera require the application to be explicit about the absolute panel of the camera, rather than intended direction, they are not sufficient to handle scenarios where the camera which best fulfills that role may dynamically change, based on the current posture of the system. With cameras, there is no method to return a "default" device. The pattern is instead similar to audio; callers receive a "default" camera by initializing a media capture provider with 'default' initialization settings, using a method for initializing a default media capture device.

Applications may be expected to make an explicit selection by examining the attributes of all camera devices. Specifically, once the caller has inspected absolute panel locations (front, back) of all devices, the selected device may be set as the video device member of the media capture initialization settings, and used with a method overload for initializing the default media capture device. However, this explicit decision-making process is performed by the applications.

Like audio, an application's selection of a camera is likely to take the application's view into consideration. Unlike audio however, there may be multiple devices that may all be said to have some affinity to the application's view, so there may be an additional need for the application to express some intention.

At a minimum, the camera stack may reconcile the internal mechanism by which it currently selects a 'default' with the new system chassis form-factors and postures obtained from the OS (i.e. the dynamic device properties) to ensure that it continues to select a camera that fulfils the same role as what is selected today. For example, if the 'default' initialization settings prefer a "rear-facing" camera, it may need to consider application view, system chassis, and posture so that it may continue to select a camera that is actually rear-facing in a current configuration, rather than a camera that is implemented on a "back" panel but may be in some postures actually forward-facing.

Ideally, since the direction a camera is facing is a significant factor in camera selection, it should be accounted for with some facility in that class that allows that intention to be specified. One possible approach for allowing a camera device to be selected based on dynamic attributes that may change in response to external factors such as "posture" is to allow the video device member of the media capture method to specify a moniker for dynamic attributes, such as "front-facing", "rear-facing", and the like.

The media capture initialization method may already require applications to call it with context about the User Interface (UI). As such, the initialization method could find the display device associated with the application's current view, interrogate the system for the current "posture" of the device using dynamic device properties, leverage the platform description of the system chassis provided by ACPI _PLD, and determine the appropriate camera to use to satisfy the request.

Similar to the display/input and audio scenarios described above, the camera stack could also benefit from a common set of routines that help identify and resolve device relationships, accounting for unique system chassis designs and posture influence. For example, during a 'default' initialization of the media capture method, the camera stack may determine the display device best associated with the application's current view and use information about the Container IDs and ACPI _PLD location of camera devices to find the 'default' camera device best associated with that display device. The camera platform may consider supporting other ways for applications to specify a preference for direction of cameras, which may account for ambiguities or changes affected by system posture, or the application's current view. Existing media capture initialization methods may be modified, and new device selection methods may also be introduced for consistency with other device classes.

Looking again at camera selection as the example, an application's selection of camera may be partially determined by the location where its view is hosted and partially determined by a specified intent for the camera. Even in the simple tablet or laptop scenario, which has a single display and cameras on the front and back panels, the application may specify intention in the form of the direction it expects the camera to be facing, before any component makes a selection. If no intention is specified, multiple objects may be returned in order for the application to decide.

Figure 16:
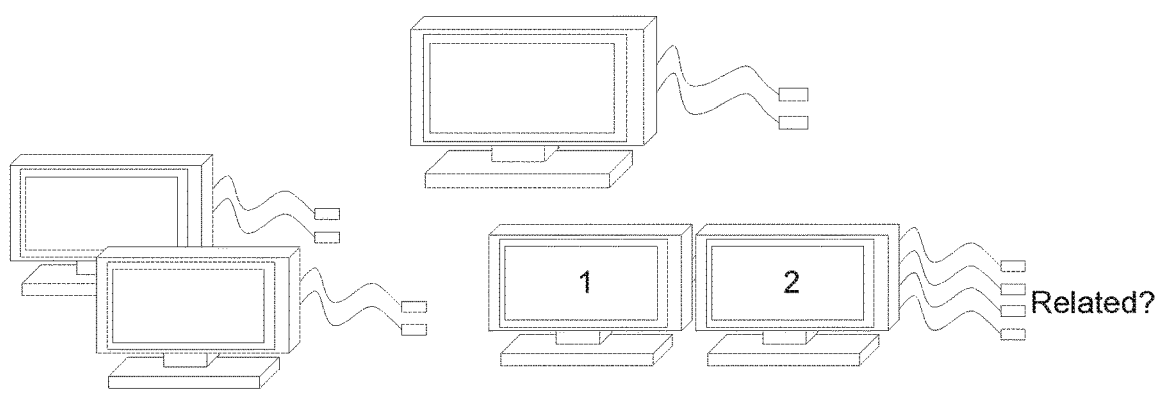
FIG. 16 is an exemplary block diagram illustrating separate physical device enclosures.

FIG. 16 is an exemplary block diagram illustrating separate physical device enclosures. While the enclosure and panel descriptors are useful for describing physical packaging, computing scenarios are very diverse. For example, the devices within an enclosure that work best together for some scenarios may not necessarily be located on the same physical panel or may not even reside in the same physical enclosure. Similar to directional relationships, scenario relationships may inform whether to generalize the mechanism for inferring posture-influenced relationships, or whether an established pattern may be provided.

A scenario relationship may exist among devices that is defined by the experiences the devices provide together, more than any specific spatial relationship between the devices. For example, early USB webcams did not include microphones; "video call" scenarios leveraged the microphone connected to the integrated sound card of a computer system. Additionally, scenario relationships often transcend physical enclosures as existing independent devices are leveraged to create new scenarios. For example, scanners, modems, and printers in different physical enclosures created virtual "fax machines" long before they were physically enclosed in the same external physical enclosure. It may not always be possible, practical, or even desirable to create a single physical enclosure for a group of devices that participate in some scenario. A traditional desktop "multi-monitor" experience combines multiple external monitors with input devices, all in separate physical enclosures, to create a single coordinated display and input experience, for example.

Scenario relationships are often also dynamic. Devices may move in and out of a scenario without any changes to their physical state. Devices may also be a part of multiple, independent scenarios. Some scenarios may also involve certain types of spatial relationships between devices. As one example, a scenario relationship may be established for a touch input device and a display device, where the touch input device overlays the display device on the same physical panel. As another example, a scenario relationship may also be established for an external mouse and a separate externally-connected physical monitor device.

Devices within the same physical container may have a scenario relationship of being in the "same enclosure". For example, devices in a system chassis have a scenario relationship of being "inside the PC". A rear-facing camera may have an "opposite panel" relationship to the display. The physical relationships are defined by device characteristics that may be discovered by the device platform, allowing them to be exposed as first-class relationships within the device platform. In some examples, the device platform itself may manage the scenario relationships for the physical relationships between devices.

Removing devices from their natural spatial relationships creates a distorted view of the physical world, which may have an impact on experiences built on top of those relationships. For example, forcing an external USB mouse device to be reported as inside the same physical "enclosure group" as the external keyboard it is paired with on the desktop may cause applications to incorrectly assume that the user has a single physical keyboard with touchpad or trackpad capabilities.

While certain spatial relationships may influence some scenario relationship between devices, not all scenario relationships between devices may be represented by spatial relationships. Some instances of the scenario relationship may map more closely to a physical relationship, however there are often variations in those same scenario relationships that do not map to the physical relationship.

While existing spatial relationships may not be adequate for describing a scenario, it may be desirable to leverage the device platform as the "common currency" for describing devices and persisting information about the scenario relationships that they participate in. This may allow existing device APIs and discovery patterns to be used to find related devices in a common way.

Device container relationships may be established by the device platform, based on input from the hardware platform and device drivers that detect and report these devices. For example, the PnP device platform allows bus drivers to specify whether a device is "Removable" from its parent device or not. The device platform uses that information as a default heuristic for finding the boundaries between physical enclosures and builds a "container group" relationship between all devices detected to be within the same physical enclosure group.

To determine whether a device is physically removable from its parent device, bus drivers typically consult bus-specific hardware registers for information about physical connections. There are additional provisions for how an OEM may leverage the system firmware tables to supplement information about how devices are connected. The "Container IDs" that the system generates for each device may be compared to establish a "same-enclosure" relationship to other devices. The default experience for representing physical enclosure relationships is through the Windows™ "Devices and Printers" desktop UX, for example. Programmatically, Device Containers are also represented as first-class objects by the device enumeration API, in some examples.

For example, the "Computer" container is a well-known instance of a container. All integrated devices which are enclosed by the computer system chassis (such as a graphics adapter and hard disk drive) are implicitly part of the same well-known "Computer" container. Similarly, all devices that are externally connected to the system chassis but are themselves in a single physical housing (such as the printer and scanner of a multi-function printer device) are in a single container, separate from the Computer.

Often, the devices of a single physical container are externally connected to the system chassis over multiple different bus connections (such as an external display and separate USB touch digitizer). Regardless of these multiple connectivity buses, the physical enclosure relationship is expected to be accurate. The Container ID mechanism has provisions for how drivers and devices may help the system by each explicitly describing the same physical container grouping they should be considered a part of.

In some scenarios, multiple external displays with touch input are associated. As described above, the display and input stacks are currently "container-aware" for the purposes of associating touch input with the correct display. The Container ID specification outlines support for displays describes how to influence the mechanisms for assigning the Container IDs to externally connected USB touch devices, such that they are associated with the display.

When multiple external displays are discovered over an external connection, a unique container ID may be generated for each. Each touch digitizer associated with each external display may also have a separate connection to the system. Some existing guidance for associating USB connected devices with the corresponding display in the same external containers still applies, and the display and touch stacks may correlate these external devices the same way they do now. While it is possible to understand that devices belong to the same physical enclosure, there is no other known mechanism for the spatial relationship that multiple external physical enclosures have between each other.

As previously mentioned, the model of comparing Container IDs breaks down for multiple devices within the same physical enclosure. While devices integrated into a system chassis may be described by the OEM using ACPI PLD location information, ACPI cannot describe arbitrary externally connected devices.

However, examples herein provide descriptor extensions that enable a system to identify related devices, including external devices, and their spatial relationship and capabilities relative to each other in order to leverage those capabilities for specific scenarios and user experiences.

Figure 17:
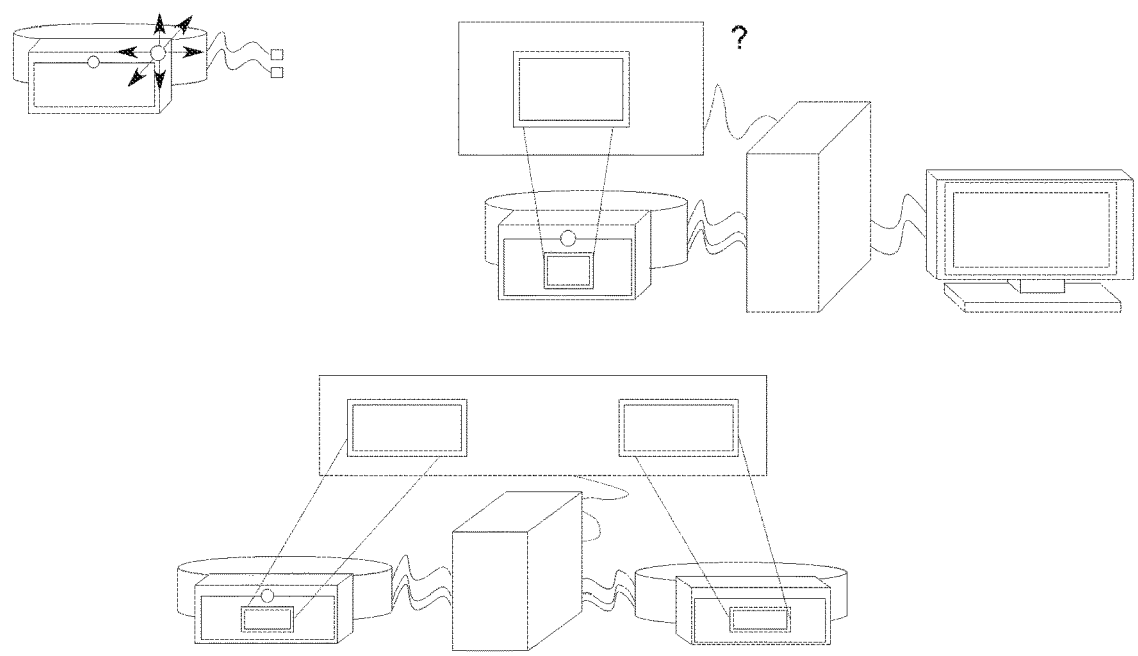
FIG. 17 is an exemplary block diagram illustrating physical and logical device affinities.

FIG. 17 is an exemplary block diagram illustrating physical and logical device affinities. The scenarios for identifying devices related to a tethered head-mounted display (HMD), for example, are similar to those for an externally connected display. At a minimum, a tethered head-mounted display may be connected to the display device of the PC and may appear as an externally connected monitor. A head-mounted display may also likely include multiple sensors for tracking the position of the device, as well as a camera for detecting the surrounding environment. These devices may be connected to the PC over a separate external connection, such as USB for example.

Because all of these devices in this example are part of the same physical enclosure, the devices may be provisioned to report the same unique "Container ID", as discussed earlier. When all of the individual components in the physical enclosure are assigned the same container ID, systems components that implement Holographic or Virtual Reality experiences may leverage this association to see that these devices have a natural affinity to each other and infer that they work together to provide the same experience.

As illustrated in FIG. 17, "Virtual Monitor" devices may be created so that the shell may present 2D classic "desktop" applications onto a 3D display surface. These 2D renderings may be displayed for the user, within the display experience associated with the HMD. Since virtual monitors are implemented as PnP devices, and PnP devices are associated with physical containers, a virtual monitor may be associated with either the PC or the HMD, for example. Although the virtual monitor is used to present 2D content for the HMD environment, virtual monitors do not actually have strong affinity to the HMD. As such, it is possible for the same virtual monitor to be used to render content that would be displayed on multiple HMDs.

The virtual monitor may be used as a target for rendering content, independent of the display surface to which it will actually be displayed on. In this example scenario, the "shell" that is responsible for managing the presentation of the content from the virtual monitor, onto the display surface of some other physical monitor, may manage the scenario relationship between the virtual monitor and any other physical devices that it may display that content for the experience. However, the virtual monitor does not actually belong to any container, not the PC container or any HMD container, for example.

To support scenarios where a logical device, such as a virtual monitor for example, should be associated with no container, the Container ID mechanism supports reporting the "NULL GUID" as the container ID for the device. This tells the system that the device is part of 'no container'.

Figure 18:
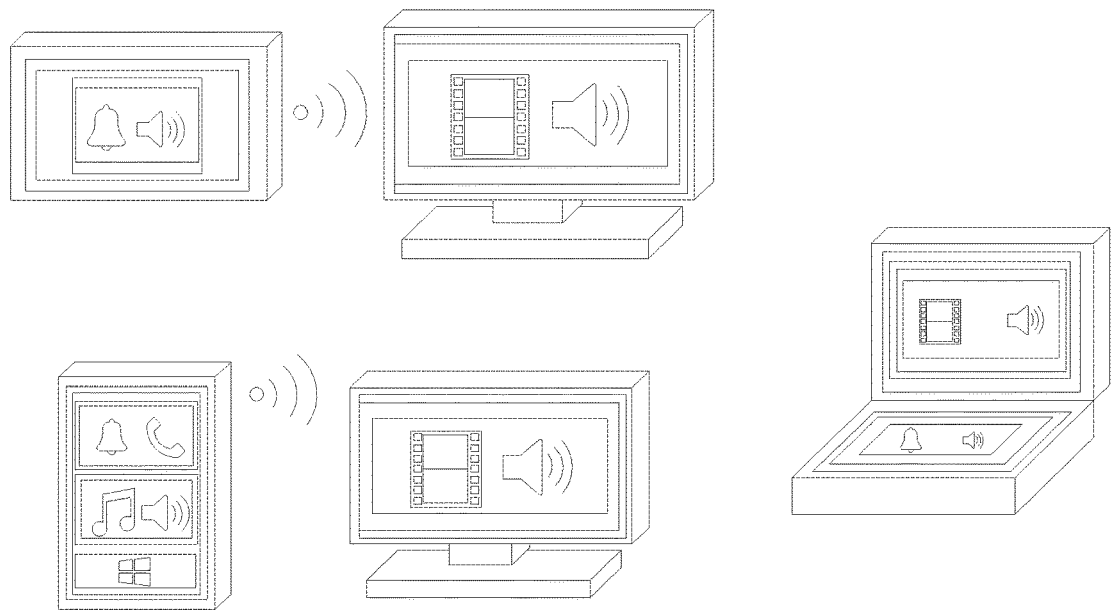
FIG. 18 is an exemplary block diagram illustrating enclosure relevant device endpoints.

FIG. 18 is an exemplary block diagram illustrating enclosure relevant device endpoints. In the examples depicted in FIG. 18, audio is associated with an application's current display.

While the system supports multiple audio endpoints, most applications typically only play audio to the "default playback device". While the current active default device may change as different audio devices are added and removed from the system, there is still only one default playback device for all applications at a time. This means that all system audio will typically be played to the same single audio endpoint, even though an application may be running on a display that has a greater affinity to a different audio device.

In some scenarios an application's display may have a greater affinity to a different audio endpoint device from the default, such as remote display duplication or casting scenarios, where an external display is used at the same time as the device's primary integrated display. For example, in a Miracast™ scenario, it is highly desirable for video content on a remote secondary display to use the audio device for that display. Rather than make the remote display the default for all application audio, it may also be desirable to continue to use the integrated audio of the device for system notifications so that the application experience on the remote display is not interrupted.

In these scenarios, a "Container ID" defines a shared-enclosure relationship between the display and audio devices and may be used as the primary key for selecting an audio device. Other scenarios may include examples where there are multiple audio endpoints integrated into a single system chassis with multiple integrated display devices. In addition to the container, the audio subsystem may inspect the ACPI PLD information supplied by OEMs to learn the enclosure-relative location of available audio endpoints, as they relate to displays.

The difference between the display/touch and audio scenarios however, may be in where that selection is made. The configuration of display and touch input devices may be a very explicit configuration action, performed by the system-level components, to create a visual input/output coordinate space. The end result of the configuration is an abstraction for display and input; the application is rarely concerned with either of these devices directly. In the case of audio however, these devices may represent physical endpoints which are consumed somewhat directly. Most applications perform some 'default' action and may expect the audio subsystem to handle this correctly.

Although an application could explicitly select an appropriate audio endpoint for their current display view, it is desirable for existing 'default' functionality to implicitly produce the correct behavior. Because most applications do not select an audio endpoint explicitly, the correct selection is made for each application, based on its current view, by the audio device class implementation itself. Similar to the display/input scenarios described above, the audio stack may also benefit from a common set of routines that help identify and resolve device relationships, accounting for unique system chassis designs and posture influence.

Figure 19:
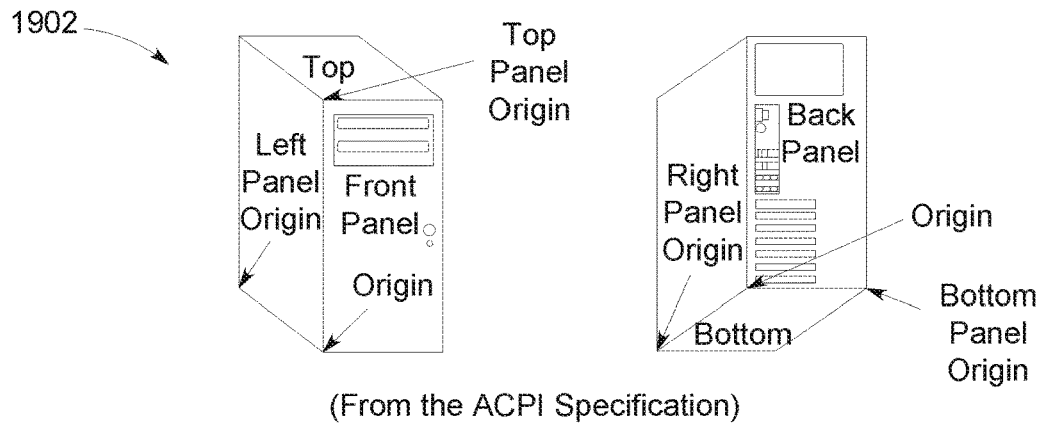
FIG. 19 is an exemplary block diagram illustrating a model for a desktop form-factor system chassis with one group of panels.

FIG. 19 is an exemplary block diagram illustrating a model for a desktop form-factor system chassis with one group of panels. The ACPI specification defines the optional _PLD method and a schema to describe the absolute positions and orientation of "connection points" (ports for USB, Ethernet, Audio, SPDIF, SATA, 1394, and the like) on some panel surface of the system chassis.

The ACPI specification assumes well-known system chassis types: desktop, laptop (base and lid), mobile/handheld. Arbitrary system chassis types are not explicitly defined. The descriptor may also be augmented with OEM-specific data buffers that may provide other physical location information specific to certain systems or class of machines. For some time, the ACPI _PLD information has been used to supplement the information bus-drivers know about devices that are internal to the computer. This information is used to help influence the algorithm for generating Container IDs so that devices are assigned to the correct container for their physical enclosure.

For example, the information available from the USB hub registers may not accurately indicate whether a USB-connected device is internal to the PC or not. The system OEM may use the ACPI _PLD method to describe the device at some port as not "UserVisible", allowing the device platform to assign this port the same Container ID as its parent. This allows internal USB-connected webcams to be accurately described as "internal" to the PC, while a USB-connected webcam connected to an external-facing USB port would be accurately reported to be in a separate physical enclosure (different container from the PC).

Reference _PLD entries may be used to describe any visual boundary. This may include both panel edge boundaries and connection group boundaries. Since all positional offset and dimensional size attributes are global, the panel boundaries may be differentiated from other Reference _PLD entries by having a (0,0) initial positional offset and the largest size in both the Horizontal and Vertical dimensions.

When a _PLD method is associated with the ACPI device node entry that corresponds with a PnP device, the _PLD entry describes the location and position of that device. To describe the size of the panels themselves, the _PLD may be used on non-connection points (for example the root _SB "system bus" object), with the Reference flag set to indicate they are meant to serve as a reference for the other connection points.

Additionally, the operating system is capable of expressing "Panel Location" information about devices inside the Computer container using information in the system BIOS, provided directly by the system manufacturer (OEM). As discussed earlier, the ACPI specification defines an optional method for the computer system manufacturer to describe the location and characteristics of each device that is known to the system, namely _PLD. The schema for the information allows for the device to be described in terms of (without limitation):

Whether the connection point of the device is user-visible
Which absolute panel of the enclosure (base or lid) the connection point resides on
The relative vertical and horizontal position of the connection point on the panel (left, right, center, etc.)
The absolute position of the connection point, relative to the well-defined "origin" point (0,0) defined for the panel
Shape and size of the connection point
Color of the connection point The _PLD description of each device may include the specific panel surface of the system chassis that the device is associated with. For the purposes of _PLD, a system enclosure is modeled as either a single six-sided cuboid (desktop or tablet form-factor) or a hinged set of two six-sided cuboids (a laptop-style form-factor).

Each face of a cuboid defines a panel surface with a well-known identity (Panel=Front|Back|Left|Right|Top|Bottom), as depicted in cuboid model 1902. For a laptop-style chassis, the two cuboids (or panel groups) are differentiated as either the lid or the base (Lid=0|1), discussed further below in FIG. 20.

Once _PLD entries have been created for the panel, it is now possible to identify the distance between a device and the edge of the panel surface. For example, this may be very useful for identifying the distance between the edge of the screen and the edge of the panel surface that it is mounted on. The difference between the initial Horizontal and Vertical offset of the panel and the device, and the distance between the Horizontal and Vertical sizes of each define the edges of each element, and the distance between them.

Figure 20:
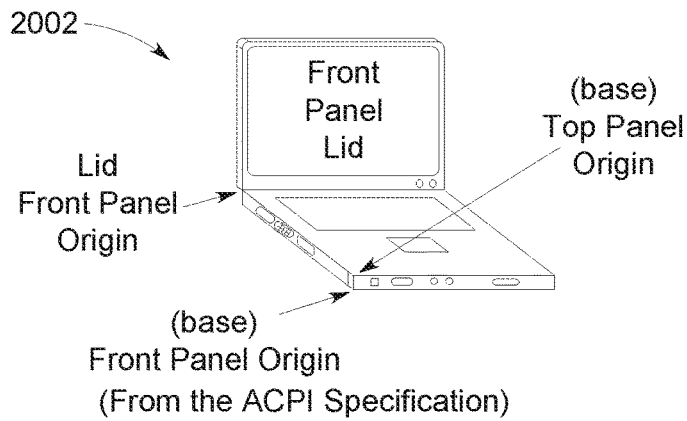
FIG. 20 is an exemplary block diagram illustrating a model for a laptop-style form-factor system chassis with two groups of panels.

FIG. 20 is an exemplary block diagram illustrating a model for a laptop-style form-factor system chassis with two groups of panels. For the laptop-style form-factor, the panel groups are implicitly hinged at (1) the edge between the Front and Bottom panel of the lid and (2) the edge between the Top and Back panels of the base, as depicted by model 2002.

The documented layout of the panels for the laptop enclosure establishes well-known relationships of the panels. The Front panel of the Lid is "opposite facing" from the Back panel of the Lid, the Top panel of the Base is "adjacent" to the Front Panel of the Lid, and so on. By definition, these relationships extend to devices that are described by _PLD to be located on those panel surfaces. This creates discoverable relationships between devices which have a described physical location within the system enclosure.

Consider a_PLD entry for the Front Panel Lid (identified as the furthest reaching Reference) and the _PLD entry for the display screen mounted on that panel (necessarily smaller in size than and contained by the panel's Reference entry). With these two _PLD entries, it is possible to determine the distance between the screen and the edge of the panel, for all edges of the device and panel. This will help determine the size of the 'seam' between the display panel and the hinge (and also the adjacent panel).

A system enclosure that includes devices on both Lid and Base panel groups is assumed to have a single hinge that joins the two panel groups. If such a system includes an angle sensor, it is assumed that device measures the angle between these two panel groups, at the well-defined location of the hinge.

The approximate angle of the sensor defines several potential well-known "postures" for the system (tent, napkin, etc.) which each describe some fixed relationship between the panels on the two panel groups. From this information, a "posture-dependent" table of additional relationships that devices on opposite panel groups may have is derived. For example, when the system is in the 'tent' posture, the Front of the Lid is 'facing opposite' the Top of the Base. When the system in the 'napkin' posture, both the Front of the Lid and the Top of the Base may be considered 'facing opposite' from both the Back of the Lid and the Bottom of the Base.

Because posture-derived relationships such as 'opposite' require a current reading from the posture sensor (in addition to _PLD described device locations), this type of relationship may be best expressed within a programmatic layer that also defines the current posture of the system. This may help any callers reason about what the relationship means, relative to the current posture of the system—for example, why there might be multiple panels considered 'opposite' at some times, but only one such panel at other times.

As defined by the ACPI specification, the specific panel of the system chassis that each device is associated with may be expressed through the Lid and Panel elements of the _PLD data for that device. For example:
UINT32 Lid:1;
UINT32 Panel:3;
Where the panel surfaces are defined as:

```
// Panel surface bits 67:69
enum AcpiPldPanel
{
    AcpiPldPanelTop     = 0,
    AcpiPldPanelBottom  = 1,
    AcpiPldPanelLeft    = 2,
    AcpiPldPanelRight   = 3,
    AcpiPldPanelFront   = 4,
    AcpiPldPanelBack    = 5,
    AcpiPldPanelUnknown = 6,
};
```

A device may have some affinity to a panel surface or panel group (Lid|Base) even if it is not visible to the user on the external surface of the panel. When applicable, it may be desirable for integrated devices to be described with the panel that its physical location inside the enclosure is most closely associated with, such as:
UINT32 UserVisible:1
If the user does not perceive the device on the external surface of the chassis, the UserVisible field should be set to 0. Specifying a panel for a non-visible device may be useful for devices that have spatial awareness to the physical world, but which the user does not directly interact with—for example, an accelerometer sensor.

In addition to the Panel and Lid fields in a PLD descriptor, there exists a CabinetNumber field. While the Lid field may be used to distinguish a panel as being part of a secondary lid panel group of a laptop enclosure, as opposed to the primary panel group, the CabinetNumber field may be used to represent up to 256 (0-255) different panel groups. The ACPI specification is currently not explicit about the usage of the CabinetNumber, only indicating that this field should always be set to 0 for a single cabinet system. There is also no known usage of the CabinetNumber field in existing hardware configurations or OS software components. As such, examples described herein establish a usage model for the CabinetNumber field that treats a system enclosure comprised of multiple panel groups as a multi-cabinet system enclosure. This enables a laptop to be modeled as a simple two cabinet system, while providing additional flexibility for modelling more complex multi-cabinet system enclosures.

When using the Lid field, the association of the lid panel group and the system panel group is implicit, with the edge between the front and bottom panels of the lid being attached to edge between the top and back panels of the main system enclosure compartment. With the CabinetNumber field approach there is no longer an implicit association between cabinets in terms of their adjacency or orientation relative to one another. This presents a need for additional information to describe relationships between cabinets in a more explicit way.

Additionally, aspects of this disclosure enable a schema that is configured to be able to describe a system enclosure that is more complex than a laptop form-factor having two sub-compartments, such as new, emerging, and future form-factors that may include any number of sub-compartments associated with each other in any manner of relationship.

Figure 21:
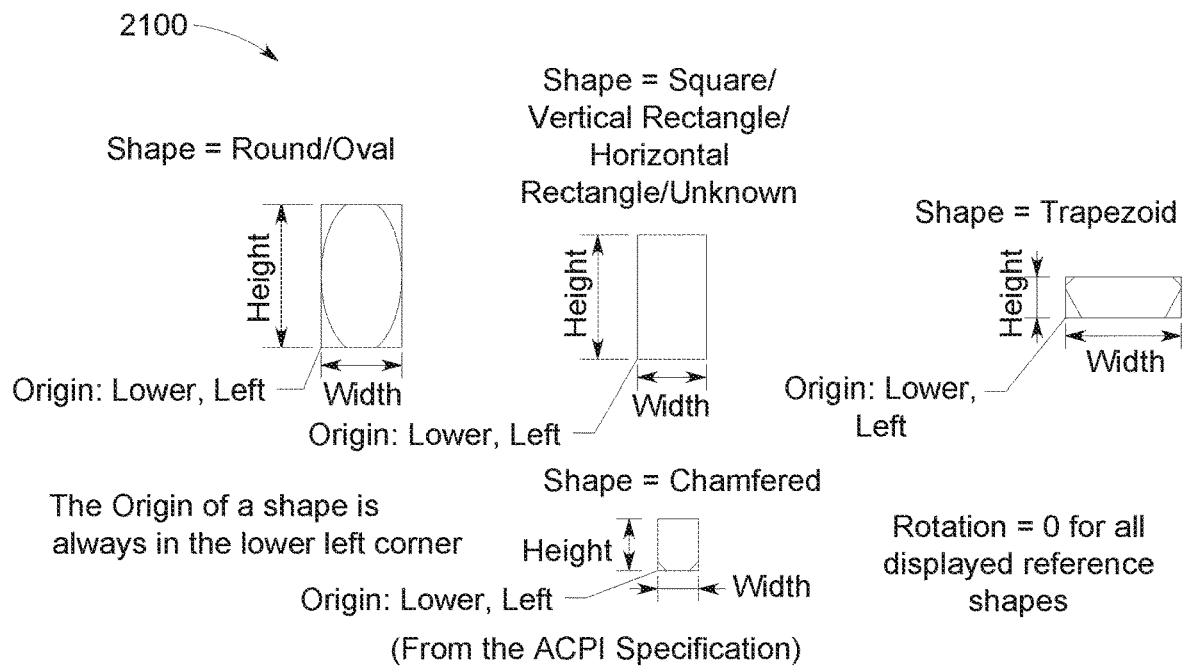
FIG. 21 is an exemplary block diagram illustrating physical shape descriptors derived from PLD data.

FIG. 21 is an exemplary block diagram illustrating physical shape descriptors derived from PLD data. The _PLD location information for a device may further specify the exact location on the panel surface that a device is located on. In the current _PLD revision, there are actually two mechanisms for specifying location. The original version-1 definition of _PLD allowed for a device's location on the panel to be specified only generally as horizontally Left-|Center|Right, and vertically Upper|Center|Lower. For example:
UINT32 VerticalPosition:2;
UINT32 HorizontalPosition:2;
The general positions are defined as:

```
// Vertical position 70:71
enum AcpiPldVPos
{
    AcpiPldVPosUpper    = 0,
    AcpiPldVPosCenter   = 1,
    AcpiPldVPosLower    = 2,
};
// Horizontal position 72:73
enum AcpiPldHPos
{
    AcpiPldHPosLeft     = 0,
    AcpiPldHPosCenter   = 1,
    AcpiPldHPosRight    = 2,
};
```

The newer version-2 definition of _PLD allows for an exact device location to be described in terms of horizontal and vertical offset measurements. For example:
UINT32 VerticalOffset:16;
UINT32 HorizontalOffset:16;
In each example above, the description is relative to the well-defined origin of the panel, as shown in the panel illustrations in FIG. 19 and FIG. 20. All devices in a modern computer system with physical attributes should be described using the v2 definition of PLD and should specify both the precise horizontal and vertical offset measurements of the device, as well as the general location of that device on the panel.

In order to truly understand the area that a device occupies on a panel surface, an understanding of its size is needed. The area is specified with width and height. For example:
UINT32 Width:16;
UINT32 Height:16;
Modern systems should include _PLD data that describes the visible area of a device connection point on the panel surface. For devices that are not visible to the user, size may still be relevant for describing the area over which a device operates. For example, the location and size of an angle sensor may be used to describe the edge of the panel surface from which the device receives data.

Additionally, while the overall dimension of a device is described in terms of width and height, the actual physical shape may be something other than square. For example, a monitor screen is rectangular while a camera lens is typically round. The Shape field of the _PLD data describes the shape of the device, or its visible connection point. For example:
UINT32 Shape:4;
The following shapes are currently supported (as depicted in shapes 2100):

```
// Shape bits 74:77
enum AcpiPldShape
{
    AcpiPldShapeRound      = 0,
    AcpiPldShapeOval       = 1,
    AcpiPldShapeSquare     = 2,
    AcpiPldShapeVRect      = 3,
    AcpiPldShapeHRect      = 4,
    AcpiPldShapeVTrap      = 5,
    AcpiPldShapeHTrap      = 6,
    AcpiPldShapeUnknown    = 7,
    AcpiPldShapeChamfered  = 8,
};
```

A device (or its connection point) may also be mounted on the panel surface with some specific rotational orientation. The rotation is specified from among a set of well-known values that describe the angle of rotation, in degrees clockwise. For example:

```
// Rotation bits 115:118
enum AcpiPldRotation
{
    AcpiPldRotation0    = 0,
    AcpiPldRotation45   = 1,
    AcpiPldRotation90   = 2,
    AcpiPldRotation135  = 3,
    AcpiPldRotation180  = 4,
    AcpiPldRotation225  = 5,
    AcpiPldRotation270  = 6,
    AcpiPldRotation315  = 7,
};
```

The angle of rotation is around the origin of the shape, as illustrated by shapes 2100, and is relative to origin of the panel surface on which it is located. Even if the visible shape of the device is largely symmetric (e.g. round, square), the rotational angle of the device may still be meaningful for describing the orientation at which the device naturally operates. For example, the orientation angle of a camera may be used to describe whether it natively captures frames in landscape or portrait orientation. As another example, the orientation angle of a display screen may be used to describe the origin of the display's visual coordinate space and indicate whether it is naturally aligned to a "landscape" or "portrait" orientation, with respect to the device. This will help align the display according to some desired overall experience for the form-factor. The orientation angle of a touch input surface may describe how its input should be aligned, relative to the display surface which it overlays (which may be discovered based on the panel, position, and size of each), in another example. As yet another example, the orientation angle of an accelerometer may help describe the operational data of the device relative to its panel, rather than building assumptions about the orientation.

Figures 22, 23:
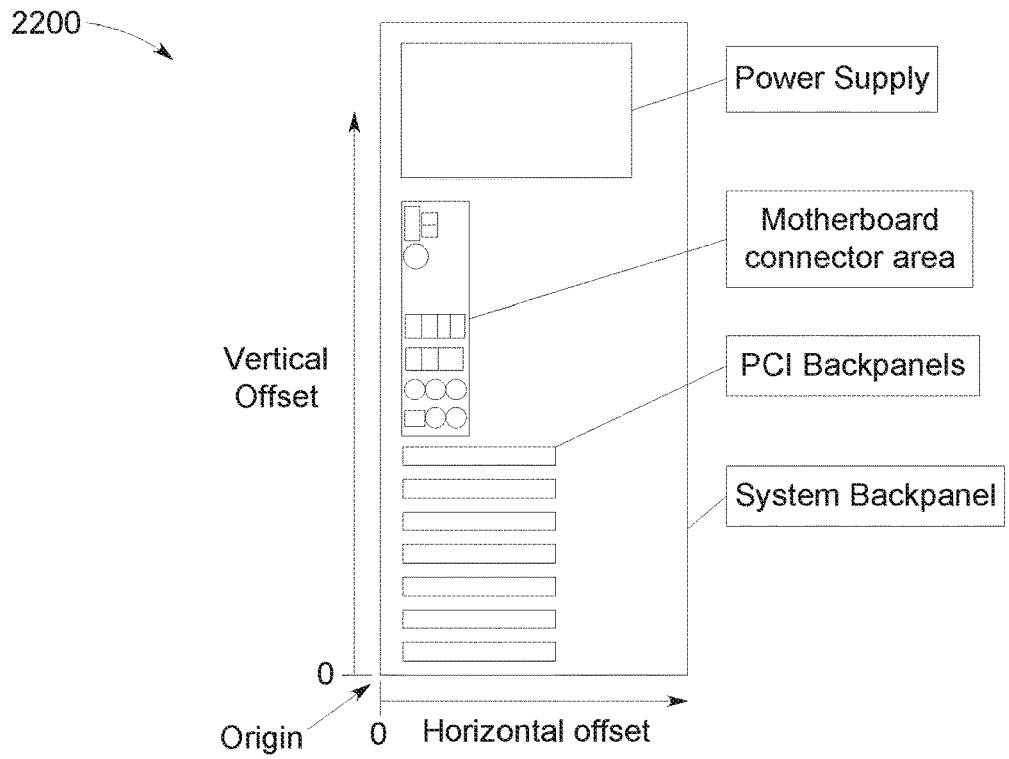
FIG. 22 is an exemplary block diagram illustrating a visual representation of a panel generated using PLD data.
FIG. 23 is an exemplary block diagram illustrating a table of PLD entries for back panel connectors and reference elements.

FIG. 22 is an exemplary block diagram illustrating a visual representation of a panel generated using PLD data. While there is currently no way for ACPI to directly specify that a system actually is a "Laptop", this is implied when multiple devices within the system include _PLD descriptors that specify panel locations within both the "Lid" and "Base" panel groups. However, this depends on the system to include descriptors for devices on each of these panel groups. If _PLD is not specified for any devices within the Lid (or in the example that no such devices have a meaningful location to specify), the form-factor of the system chassis is somewhat ambiguous.

To address this, the form-factor of the system chassis may be described using the System Management BIOS (SMBIOS). The system enclosure types of Laptop, Notebook, Sub Notebook, and convertible are among the "laptop-style" form-factor chassis types. Desktop, Tower, Mini Tower, and the like specify traditional desktop system form-factors, while the Tablet and Detachable chassis types are appropriate for tablet-style systems. As new form-factors evolve, the table of well-known SMBIOS chassis type definitions may be extended to include ways for system manufacturers to describe them.

When the SMBIOS System Enclosure type is accurately specified, this information may be used together with ACPI-based device locations to better understand the relative locations of integrated devices within their system enclosure. However, even when the form-factor of the system enclosure is known, the full dimensions of the system chassis panels themselves are not necessarily known; they may only be partially inferred based on locations of the devices that have been specified. In order to accurately represent the physical attributes of the system chassis, it is desirable to know the full dimensions of each panel of the system chassis.

The descriptors available for specifying the physical attributes of devices on a panel surface are also sufficient to specify the physical attributes of the panels themselves. The _PLD descriptor may be created for each panel and assigned the Lid|Base and Panel surface value that it represents; the shape of each panel is typically square/rectangle; the panels themselves have no rotation (0 degrees) relative to the defined origin of each panel; the panel location is at offset 0,0 from the rotation, and the width, height attributes of the panel describe its absolute size.

In order to differentiate a _PLD descriptor for a panel itself, separate from devices located on the same panel, the 'Reference' bit of the _PLD descriptor may be used. For example:

UINT32 Reference:1;

Per the ACPI specification, _PLD descriptors with the Reference bit set may be used to draw visual references for other non-reference _PLD descriptors. As depicted in diagram 2200 from the ACPI specification for _PLD, a back panel of a computer system is illustrated, visualized from several _PLD entries. The "System Backpanel" rectangle, as well as Motherboard Connector area and Power supply, are described using _PLD elements with Reference=1, as discussed further in FIG. 23.

FIG. 23 is an exemplary block diagram illustrating a table of PLD entries for back panel connectors and reference elements. As depicted by table 2300, the System Backpanel may be identified implicitly by its (0,0) offset from the origin of the panel, and also by the fact that it has the largest (width, height) dimensions of any other reference or non-reference _PLD.

Figure 24:
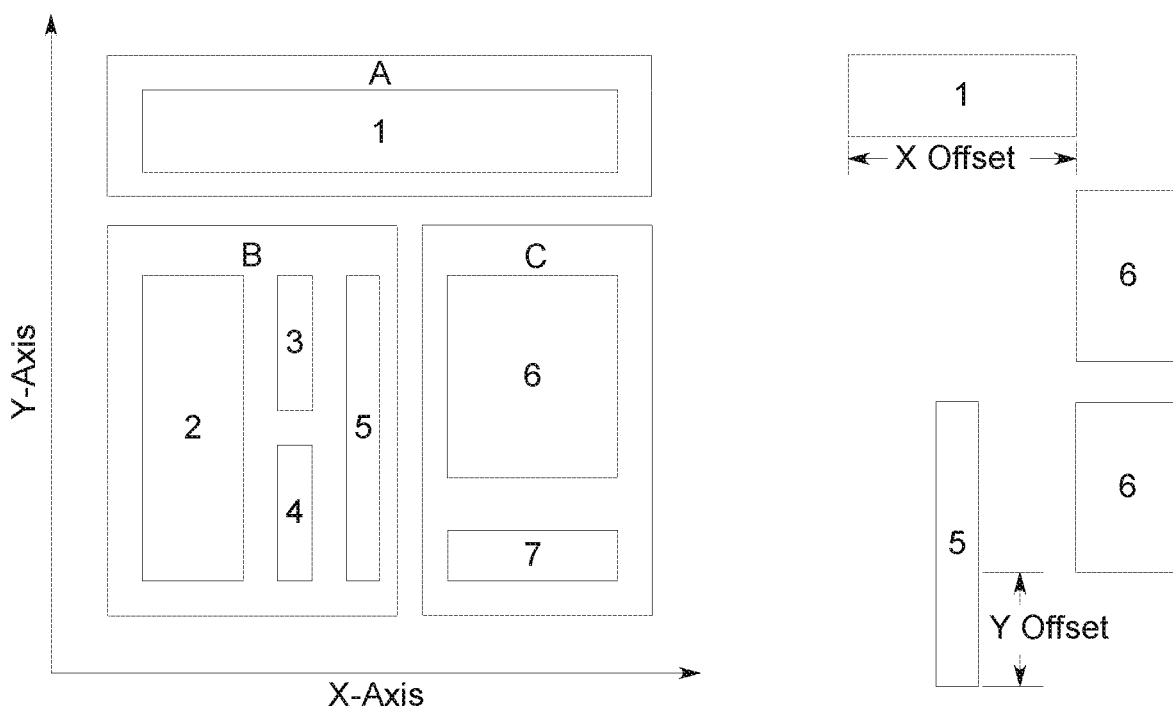
FIG. 24 is an exemplary block diagram illustrating a system chassis layout with seven panels in three panel groups.

FIG. 24 is an exemplary block diagram illustrating a system chassis layout with seven panels in three panel groups. The diagram depicted in FIG. 24 shows an example system chassis layout with 7 panels (bold lines) in 3 panel groups (dashed lines). Two panels belong to the same group if and only if they always move together. The diagram shows adjacencies between panels, but not to scale. The spatial relationship between adjacent panels is described via the X and Y offsets.

While it is useful to include Reference _PLD elements which describe physical attributes of the system enclosure panels, this is not required to understand the relationship between devices. A device _PLD entry specifies the panel on which each device resides. The configuration of panels on each panel group have a fixed relationship with each other, creating a fixed relationship between any devices located on such panels. This is independent of any Reference _PLD entries which describe specific attributes of the panels.

FIG. 25 is an exemplary block diagram illustrating a simplified panel capabilities table. A system-wide (singleton) Panel Capabilities table has a row per panel, that describes the panel's physical dimensions, any associated peripherals, and the group that it belongs to. A simplified, conceptual example is shown in FIG. 25.

The "xxx_ID_NN" values within each cell uniquely identify the corresponding peripheral within the system chassis. It is expected that there is a PnP device node for each peripheral, in which case the IDs may be PnP device IDs. Panel Group IDs identify panel groups. Panel Group IDs are unique within an OS instance and persist across boot sessions. Panel IDs identify individual panels within a group. Panel IDs are unique within a Group and persist across boot sessions as well. Spatial relationships and adjacencies between panels may also be described via tables in these examples.

FIG. 26 is an exemplary block diagram illustrating a vertical adjacency table. This illustrates a system-wide Vertical Adjacency table, with a row for every panel that is immediately above another.

FIG. 27 is an exemplary block diagram illustrating a horizontal adjacency table. This illustrates a system-wide Horizontal Adjacency table has a row for every panel that is immediately to the left of another.

Figure 28:
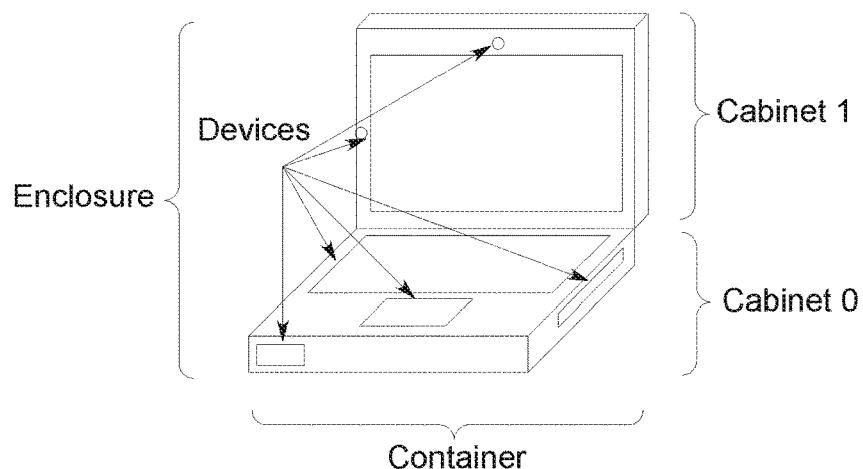
FIG. 28 is an exemplary block diagram illustrating a laptop system enclosure.

FIG. 28 is an exemplary block diagram illustrating a laptop system enclosure. As discussed above, a system enclosure may be composed of multiple cabinets, also referred to as panel groups, each with its own set of panels, and devices positioned at various locations on those panels. All such panels and devices belonging to the same enclosure are typically grouped into a single discrete container. The diagram provided in FIG. 28 illustrates a typical laptop system enclosure composed of two cabinets—a primary base cabinet with panels exposing keyboard, touchpad, and other miscellaneous devices, and a secondary lid cabinet with panels exposing a monitor and webcam.

Figure 29:
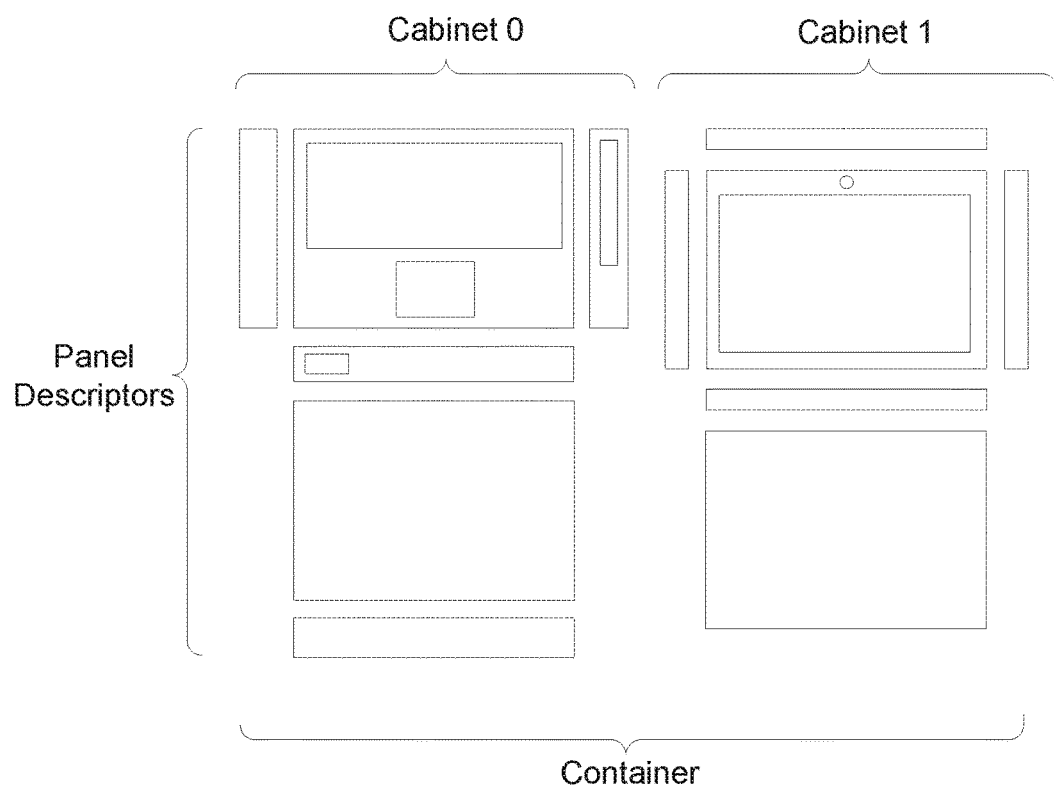
FIG. 29 is an exemplary block diagram illustrating device location descriptors with a relative panel reference points for spatial positioning.

FIG. 29 is an exemplary block diagram illustrating device location descriptors with a relative panel reference points for spatial positioning. The physical characteristics of an enclosure, such as that depicted in FIG. 28, may be described in system firmware with a set of reference panel descriptors, one for each panel of each cabinet. Similarly, the physical location of each device on the enclosure may be described with its own device location descriptor, which associates the device to a specific panel and cabinet, thereby indirectly associating it to a specific reference panel descriptor, as depicted in FIG. 29. This relationship provides a device location descriptor with a relative reference point for spatial positioning.

Figure 30:
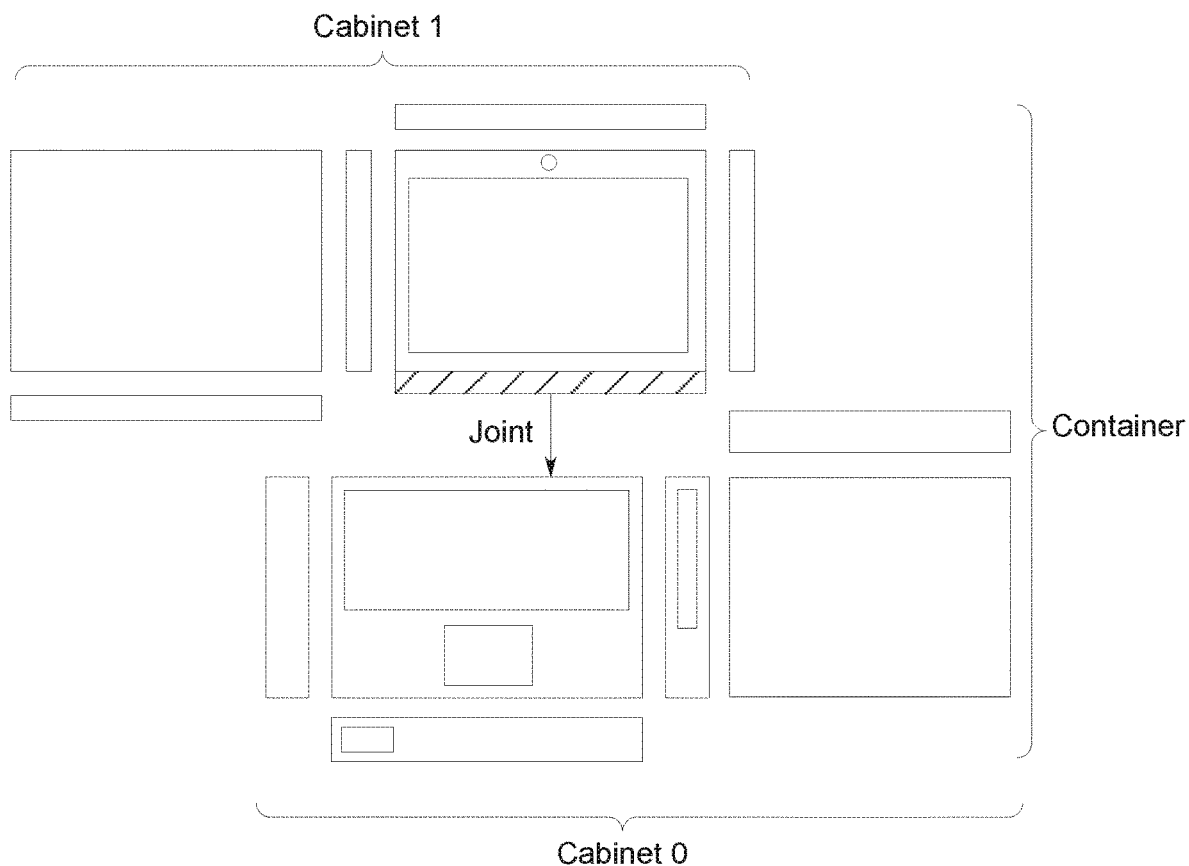
FIG. 30 is an exemplary block diagram illustrating device location descriptors with a relative joint reference points for spatial positioning.

FIG. 30 is an exemplary block diagram illustrating device location descriptors with a relative joint reference points for spatial positioning. A reference panel descriptor itself may also describe a joint that attaches its source cabinet to a target panel on a different cabinet. In this example, the front panel of the laptop lid cabinet describes a hinge joint to attach the lid cabinet to the base cabinet along the top edge of its top panel, as shown in FIG. 30.

Figure 31:
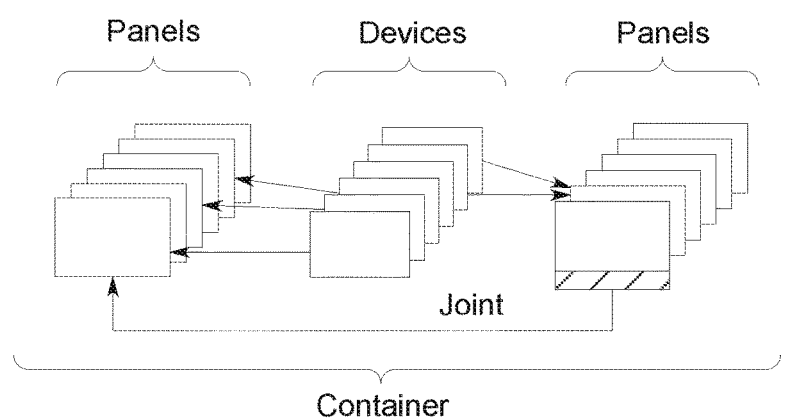
FIG. 31 is an exemplary block diagram illustrating panel and device groupings.

FIG. 31 is an exemplary block diagram illustrating panel and device groupings. Within the OS, panel descriptors are consumed by the PnP device platform and handled accordingly. Reference panel descriptors are used to instantiate an individual panel object within the PnP device object model with its own set of panel properties, including cabinet, dimensions, and relationships to other adjacent panels. Device location descriptors are associated to their corresponding PnP devices, for which it provides relative location properties and an association to a specific reference panel object. Panels are grouped into the same containers as the devices that they expose, as depicted by the illustrative example of FIG. 31.

Figure 32:
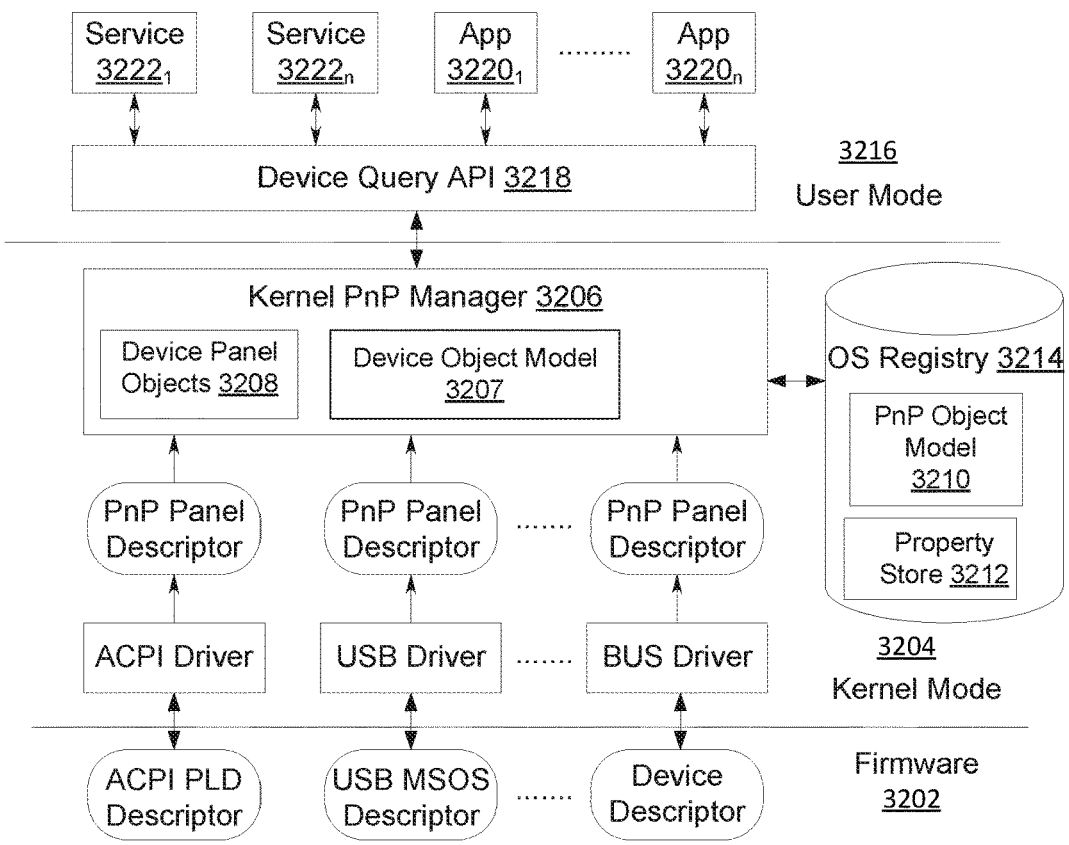
FIG. 32 is an exemplary block diagram illustrating a high-level architecture for system firmware description of device panel and location information.

FIG. 32 is an exemplary block diagram illustrating a high-level architecture for system firmware description of device panel and location information. This architecture may be surfaced to the OS and subsequently exposed to system services and user applications.

As illustrated in FIG. 32, the system or device firmware 3202 describes static device panel and location information, including reference panels that form the physical enclosure of the system or peripheral device, and the relative locations of functional device endpoints exposed on those panels. At the kernel mode 3204, the bus drivers query firmware panel/location descriptors and group them with their associated device instances. Device panel and location descriptors are translated by the protocol bus drivers (e.g. ACPI, PCI, USB, etc.) from bus/firmware-specific format into common descriptors defined and consumed by the kernel PnP platform manager 3207, or a common PnP format. The kernel PnP platform manager 3206 synthesizes common device panel and location descriptor information to generate device panel objects 3208, representing each physical panel. Generating device panel objects 3208 includes building relationships between panels and their associated device instances, defining those relationships in the generated device panel objects 3208, and populating them into a new schema, such as device object model 3207. In some examples, device object model 3207 may be partially stored in OS registry 3214 as PnP object model 3210. In this way, the new schema, such as device object model 3207, provides a mechanism for interpreting the various device schemas of associated devices into a logical object that may be used by APIs to discover underlying topology in a portable manner. The PnP object model 3210 and property store 3212, including device panel objects and device location properties, is cached in the OS machine configuration registry 3214. This is effectively the core of the PnP device platform that may be extended to support device panels as first-class objects.

At the user mode level 3216, a device query API 3218 for querying PnP device platform information provides unified access to device panel objects and device location properties for user-mode apps and system services. System applications ($3220_1$-$3220_n$) and services ($3222_1$-$3222_n$) may query static device panel and location information to discover spatial relationships of devices and use their contextual awareness to supplement static properties with dynamic properties. A higher-level API may provide unified access to device panel objects and device location properties for discovering spatial relationships of devices, and monitoring changes in dynamic properties. Additionally, lower-level interfacing between components at the kernel mode layer (i.e. drivers) may also be used to discover and work with spatial relationships.

Device query API 3218 interacts directly with the kernel PnP platform manager 3207, which provided synchronized access to the object model 3210 that may live partially within the OS registry and/or in-memory cache (for performance purposes). Depending on the complexity of the device query, the kernel PnP manager may relay the queried object information and/or perform more complex translation/reinterpretation as needed. However, the kernel PnP manager aims to optimize access to these and other kinds of device-related objects, so it may perform some or all translation/normalization of static data up front as it is initially acquired/reported by drivers for the devices they surface to the OS, to avoid having to reprocess static data with each independent high-level device query.

Support for dynamic changes in properties, such as dynamic addition or removal of panel groups, is also provided by the examples herein. Examples of such panel groups may be, without limitation, external monitors (optionally touch capable) and VR Headsets and attached game controllers. The OS learns of the association of peripherals via the PnP Container ID. However, the OS may further benefit from understanding the spatial relationships for dynamically added panel groups. These spatial relationships may be determined using the device panel objects 3208 of device object model 3207, for example. Because the device query API at the user mode level is able to obtain this spatial relationship information, different application experiences may be developed and executed on different system hardware enclosure form factors based on the new, generalized schema that defines both the physical and spatial relationships of device components. Thus, when a dynamic change is detected, such as the addition of new device component for example, the new schema is dynamically populated with the updates and the updated populated schema is used by the API of an application executing on the system to understand the different application experiences that are now compatible with the current device configuration, or associated device instances. Further, the OS of the computer system the application is executing on is able to use the new schema and device status information to understand what application experiences are currently available at a given time and may inform one or more applications executing on the computer system or provide such information to the applications upon receiving a query at the OS for dynamic device properties of the computer system.

In another illustrative example, one or more VR headsets may be connected to a computer (e.g. PC, mobile device, game console), each via multiple cables/connectors (HDMI, USB, etc.). The OS needs to be able to associate or group together all hardware components of a given VR headset. This requirement is satisfied by representing a VR headset as a single panel group. All device nodes comprising peripherals on a VR headset should have the same value for Panel Group ID, and no two device nodes representing peripherals on different VR headsets have the same value of Panel Group ID. In these examples, the Panel Group ID for a VR headset is assigned a value equal to the Container ID assigned to the VR headset (to the peripherals comprising the VR headset).

Figure 33:
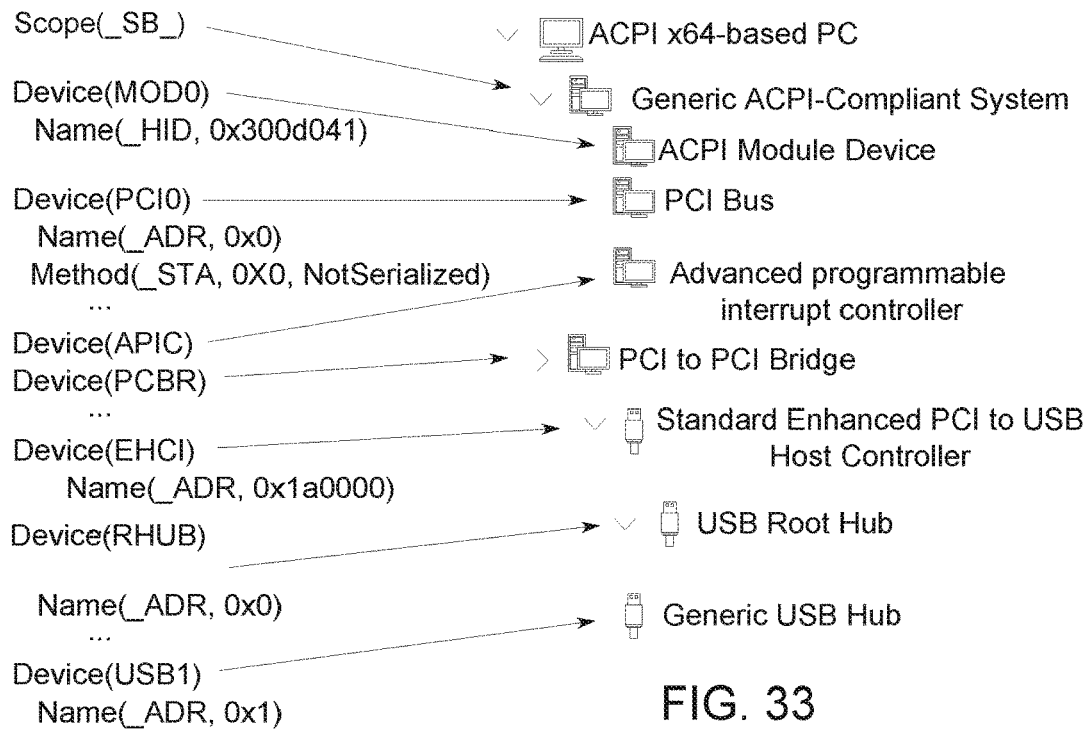
FIG. 33 is an exemplary block diagram illustrating a model for associating Advanced Configuration and Power Interface (ACPI) device information and control states to PnP devices and their drivers.

FIG. 33 is an exemplary block diagram illustrating a model for associating Advanced Configuration and Power Interface (ACPI) device information and control states to PnP devices and their drivers. While the ACPI PLD descriptor already provides a fairly well-defined scheme for describing rudimentary device location and panel information for a standard computer system, the examples herein employ and extend the PLD descriptor, enhancing the PnP platform to support device location and panel relationships. However, aspects of this disclosure are not limited to the PLD descriptor. In other examples, the ACPI _DSD (Device Specific Data) object may be used, or a new and/or custom ACPI named object may be used, to specify some device-specific properties in a custom way.

The ACPI provides a hierarchical object namespace in which various device descriptor and configuration information may be described, either as static descriptor objects or as dynamic control method objects that are invoked/evaluated at runtime. Device objects within this namespace have direct mappings to devices in the PnP device hierarchy, providing a model for associating ACPI device information and control states to PnP devices and their drivers. The exemplary diagram in FIG. 33 illustrates this relationship.

The ACPI bus driver is responsible for establishing bindings between the ACPI namespace and PnP device driver model and providing an interface for drivers to invoke ACPI control methods and query ACPI namespace objects from their respective device stacks. This is accomplished by having the ACPI bus driver propagate itself throughout the device tree, in the form of a bus filter, into the device stacks of its child devices and their descendants. In order for the ACPI bus filter to bind ACPI namespace devices to their corresponding PnP device node, there must be a match between the _ADR object of the ACPI device and the bus-driver reported Device Capabilities Address of the PnP device, or some other similar set of parallel identifiers that may be matched between the ACPI and PnP spaces. For this reason, examples herein provide for all bus drivers involved to report deterministic Address values that are unique for all child devices under a given parent device.

The ACPI PLD descriptor is defined in the ACPI namespace with a _PLD object that is associated to a specific device, such that each ACPI device can optionally define one _PLD object. A single _PLD object, however, may contain multiple nested sub objects, effectively providing a means for defining multiple PLD descriptors against a single device in applicable scenarios.

Figure 34:
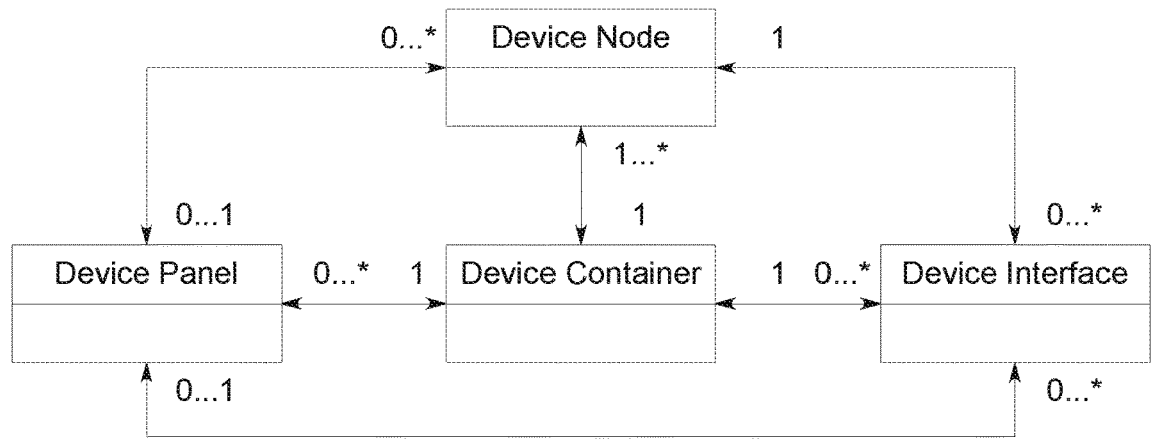
FIG. 34 is an exemplary block diagram illustrating device panels in the PnP device object model.

The ACPI PLD descriptor consists of a fixed-sized data buffer that maps to a data structure with well-defined fields, as well as a trailing dynamic-sized data region for custom OEM-defined data, which may be further interpreted by the OS or other components. For the purpose of this example, the ACPI PLD revision 2 buffer will be used as a starting point, as described in FIG. 2. The relevant fields of an ACPI PLD descriptor and their current usage semantics, as described in the ACPI specification, include: Revision, Panel, Lid, CabinetNumber, Reference, Width/Height, VerticalOffset/HorizontalOffset, Rotation, Shape, Color, and UserVisible FIG. 34 is an exemplary block diagram illustrating device panels in the PnP device object model. In order to surface device location, panel, and cabinet information to higher level callers, it may be sensible to extend the PnP device object/data model. There are a few different approaches for extending the device object/data model, such as storing all panel information entirely against device nodes as properties or creating new panel object type to store shared panel properties.

While functional, the approach of storing all panel information entirely against device nodes as properties may lead to excessive duplication of reference panel data across multiple devices that reside on non-reference panels or impose complex requirements on consumers of the data to traverse more devices in order to establish relationships between reference and non-reference panels. Instead, the approach of introducing a new panel object type to store shared panel properties may be more desirable from the standpoint that it provides a single object type and intrinsic identifier through which device nodes may easily identify their affinity to physical panel locations, unique to different cabinets, while maintaining a single instance of properties that describe a given panel on a cabinet against the panel object itself. Furthermore, such a panel object may also refer to other panel objects to establish adjacency relationships amongst themselves, even across cabinets, where cabinet numbers may be encoded into panel identities for inherent uniqueness.

Since a device panel object ID must be unique for each panel that is part of the system enclosure, and each panel side itself does not have a global identity, it stands to reason that the closely related globally unique cabinet number may be paired together with the panel side to produce a globally unique panel ID for panel surface of the system enclosure.

Support for the new device panel object type may be added at the lowest level of the peripheral device platform, such as the PnP device platform where panels would be discovered and managed as part of device enumeration within the kernel PnP manager, and surfaced through a device query API into user-mode where they may be utilized by device stacks, applications, and services to take advantage of for various device location and spatial mapping scenarios.

The example herein considers ACPI PLD descriptors and how they describe physical relationship between devices across panels on the enclosure of the system enclosure. Since ACPI PLD descriptors are generally constrained to devices that are internal to the system enclosure, they are all implicitly part of the root computer device container.

The concept and model around the usage of the ACPI PLD descriptor is also applicable to external peripheral devices, as described earlier. By establishing similar kinds of descriptors for physical device location details, devices outside of the ACPI namespace may supply their own panel descriptors to drive the assembly of external cabinets/panel groups. For instance, a removable USB device could contain an extended firmware descriptor with a PLD-like set of descriptors that define a cabinet/panel-oriented enclosure through which the USB function interfaces establish their spatial relationships to one another.

With external device panels in the picture, there is a need to be able to distinguish between panels that are part of the root/computer container or any other external device container. This is particularly useful for identification purposes, where the device panel ID is ideally able to uniquely identify panels regardless of which device container they belong to. One approach may be to add the device container ID into the device panel ID. This provides a relationship between device containers and device panels similar to that of device instances and their device interfaces, both in terms of their close parent/child relationship and how the child instance identifier embeds the parent instance identifier. FIG. 34 illustrates how the device panels fit into the PnP device object model.

Alternatively, the container ID may be used alongside the device panel ID, however it may be easy to overlook the separate container ID property when working with device panels, especially on systems where there is typically only one device container with device panels. This may lead to the inadvertent grouping of devices on panels from different containers due to the lack of a wider variety of system enclosures and devices with multiple containers to validate software applications against. For this reason, it may be more pragmatic to enforce the uniqueness of device panel IDs across containers and cabinets or panel groups by simply encoding the container ID and cabinet number into the panel ID itself to support the distinguishing panel side.

Figure 35:
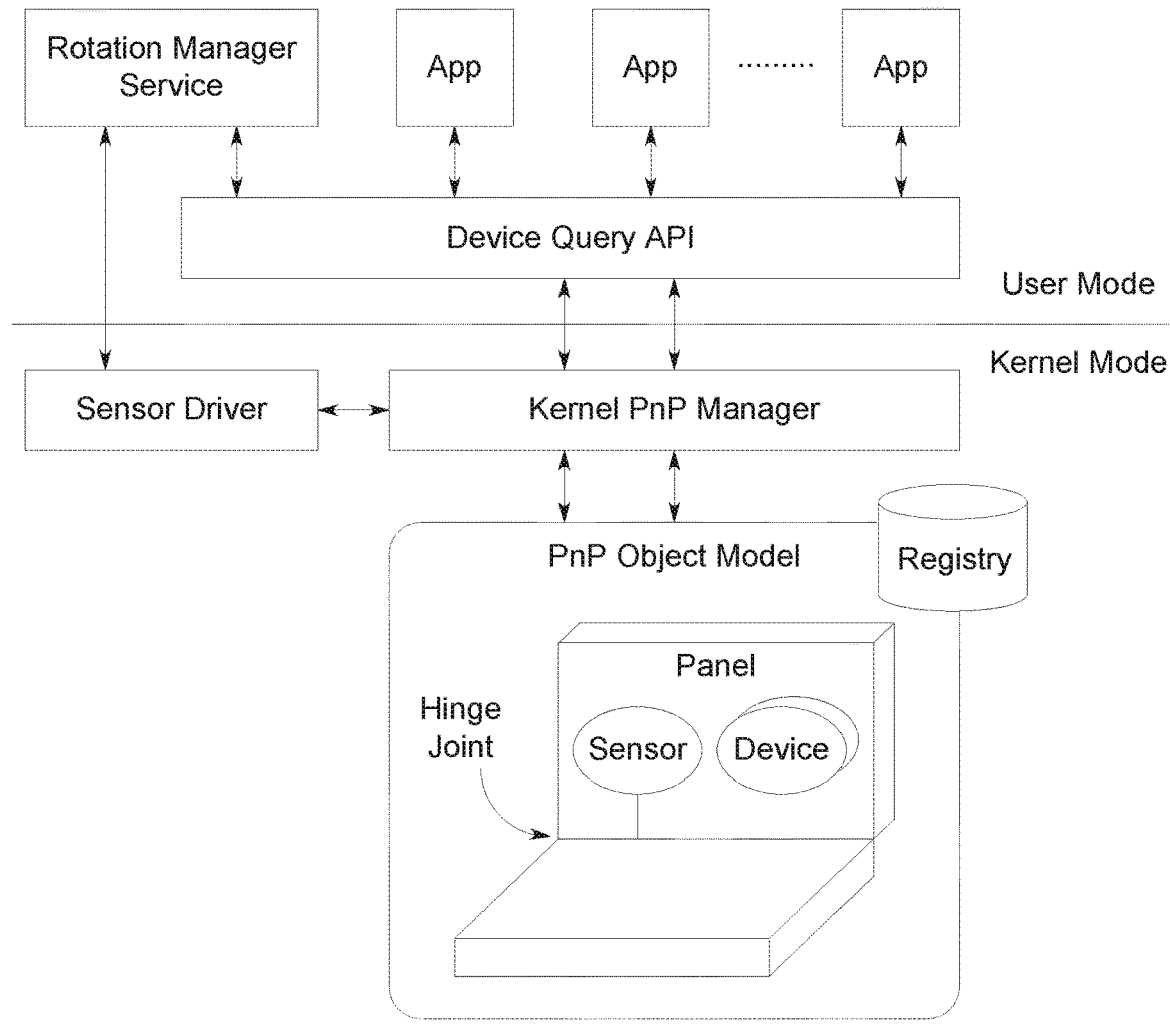
FIG. 35 is an exemplary block diagram illustrating a high-level architecture for system firmware description of dynamic device panel and location information.

FIG. 35 is an exemplary block diagram illustrating a high-level architecture for system firmware description of dynamic device panel and location information. At a high level, the device panel API essentially builds on top of the existing device property model with a new device panel object type and device panel properties. For example, the following illustrative set of properties may be made available for device panels:

| Device Panel Property | Description |
| --- | --- |
| PanelId | Panel ID: {ContainerId}\<PanelGroup>\<PanelSide> |
| ContainerId | Container ID of panel |
| PanelGroup | Panel group (i.e. cabinet number of panel) |
| PanelSide | Side of cabinet that panel belongs to (i.e. top, bottom, left, right, front, back) |
| Color | Color of panel |
| Width | Width of panel |
| Height | Height of panel |
| Devices | List of devices located on this panel |
| AdjacentPanels | List of panel IDs adjacent to this panel, representing the four neighboring panels within the same cabinet |
| JointType | Type of joint (i.e. fixed, planar, hinge, pivot) |
| JointSourcePanels | List of source panel IDs joining this panel, representing any panels from other cabinets that target this panel to join this cabinet |
| JointSourcePanelEdge | Source panel edge of joint |
| JointTargetPanelId | Target panel ID that this panel is joined with, must be on a different cabinet |
| JointTargetPanelEdge | Target panel edge that this panel is joined with |
| JointHorizontalOffset | Horizontal offset of panel joint |
| JointVerticalOffset | Vertical offset of panel joint |
| JointGapOffset | Gap offset of panel joint |
| JointRotation | Rotation of panel joint |
| JointTransform | Transform matrix for panel joint |
| JointInnerHingeRotation | Maximum inner hinge rotation of panel joint |
| JointOuterHingeRotation | Maximum outer hinge rotation of panel joint |
| JointHingeRotation | Current hinge rotation of panel joint, dynamically updated at runtime by service with access to hinge sensor device. |

The following set of device properties may be added for describing device panel and location information relative to a device instance, for example:

| Device Property | Description |
| --- | --- |
| PanelId | ID of panel that device resides on |
| PanelSide | Side of cabinet that device resides on (i.e. top, bottom, left, right, front, back) |
| PanelGroup | Group (i.e. cabinet number) that device panel belongs to |
| PanelWidth | Width of device on panel |
| PanelHeight | Height of device on panel |
| PanelLength | Length of device under panel, describing $3^{rd}$ dimension beneath panel surface, perpendicular to Width and Height |
| PanelPositionX | Horizontal position of device on panel |
| PanelPositionY | Vertical position of device on panel |
| PanelPositionZ | Depth position of device under panel |
| PanelRotationX | Roll rotation of device on panel |
| PanelRotationY | Pitch rotation of device on panel |
| PanelRotationZ | Yaw rotation of device on panel |
| PanelColor | Color of device on panel |
| PanelShape | Shape of device on panel (i.e. round, rectangle) |
| PanelVisible | Indicates that device is visible on panel (TRUE) or hidden beneath it (FALSE) |

The following set of device container properties may be added for describing device panel information, for example:

| Device Container Property | Description |
| --- | --- |
| Panels | List of panel IDs that belong to container |
| PanelGroups | Number of cabinets in container, useful to establish 1/2/N-cabinet configuration of system enclosure |

The panel properties defined in firmware descriptors tend to be fixed, or otherwise static in nature. Such static panel properties include dimensions, positional offsets, and joints. These static panel properties provide a reference for establishing how devices are located relative to each other, as well as how panel cabinets/groups are joined together. In addition to static panel properties, there also exist dynamic panel properties that may be applied to complement and/or transform various aspect of the static/reference properties, in particular those of a spatial nature. Such dynamic panel properties may include the active rotational angle or gap offset of a joint between two panels, or a transform matrix or orientation quaternion. In many cases, such dynamic properties are generally not available directly from the firmware level as they are detected, sampled, produced, calculated, or otherwise synthesized at a higher level by discrete hardware components and/or software services. For example, the hinge joining two panel groups/cabinets may be fitted with a rotation sensor to detect when the user makes adjusts to the angle. By describing the physical location of such a sensor as having an affinity with the panel that describes the joint, a higher-level system service may discover the sensor in order to sample it for angle readings and in turn update the related dynamic joint hinge angle property.

As illustrated by the diagram of FIG. 35, the PnP object model stores properties and relationships for rotation sensor device, other devices on the same panel as the sensor device, and static/dynamic properties for a panel hinge joint. The PnP device platform discovers sensor and other devices, loads drivers for them, and acts as a gateway to PnP object model for device discovery and property management. Also, at the driver level, the sensor driver controls the sensor device, exposing the device interface for access to sensor state.

At the user mode level, a device query API provides unified access to the PnP object model for system services and applications. A rotation manager service may use such a device query API to discover a rotation sensor device along with the panel that it resides on and its hinge joint. The rotation manager service would have sufficient context to monitor sensor for changes in rotation angle and update dynamic rotation angle property for panel hinge joint. In order to minimize noise and reduce frequency of property updates to only meaningful changes, a rotation angle change threshold of a reasonable size, such as fifteen degrees for example, may be used when sampling sensor data.

The aforementioned device panel objects and properties may be surfaced as a populated schema, or object model, through a device query API, such as device query API 3218 in FIG. 32 for example, providing applications and/or services with the ability to discover devices using their panel relationships, and in turn monitor for dynamic changes, such as changes in rotational angles or any other dynamic joint properties that are indirectly supplied by the sensors or other physical hardware or visual software constructs. As one illustrative example, a laptop-like system enclosure, such as that illustrated in FIG. 35, may have one or more integrated sensor devices across the panel adjacency boundary between the base of the enclosure and the lid. These one or more sensor devices may provide detection and/or reading of the angle between the base and lid of the enclosure as the angle changes based on physical interaction (such as from a user). Information about the dynamic changes in the angle between the base and lid may enable the OS and applications executing on the system to determine how other devices integrated in the base and/or lid of the enclosure are spatially related, including understanding, for example, without limitation, the dynamically changing proximity and/or occlusion of the other devices, whether or not one or more devices may be facing a user, the overall posture of the enclosure itself (e.g. closed, open to 90 degrees, open 180 degrees, etc.), and so on.

As another illustrative example, the ability to discover devices using their panel relationships, and monitor for dynamic changes, may be used to co-locate different devices on the same panel side for the purpose of pairing them together for application experiences, or measuring how close the devices are from one another to obtain positional awareness. For example, pairing a monitor device with a camera device that is above or behind the monitor device, determining which monitor device is on the left or right of another monitor device in a multiple monitor system, and/or pairing devices across multiple adjacent panels that themselves have a relative positional awareness.

As yet another illustrative example, the examples herein provide for determining the location of a device, such as a camera or speaker, relative to a monitor device as well as the spatial characteristics (i.e. position, dimensions, etc.) of the monitor device in order to render on a display of the monitor device a representation that highlights the relative location of the camera and/or speaker device. By using the discovered locations of the devices, the example enables a system to bridge the gap between what the OS or an application shows on the display and where the display is fixed to its enclosure panel in reference to other devices around it. The device platform examples herein provide a model, or schema, for describing physical and spatial relationships between devices in complex computer and/or peripheral enclosure configurations. This model enables mapping between the physical characteristics and/or attributes of enclosures and the hardware devices they contain from the physical world into the virtual world as first-class objects that applications and/or services may discover and utilize to enable new user interaction scenarios.

Figure 36:
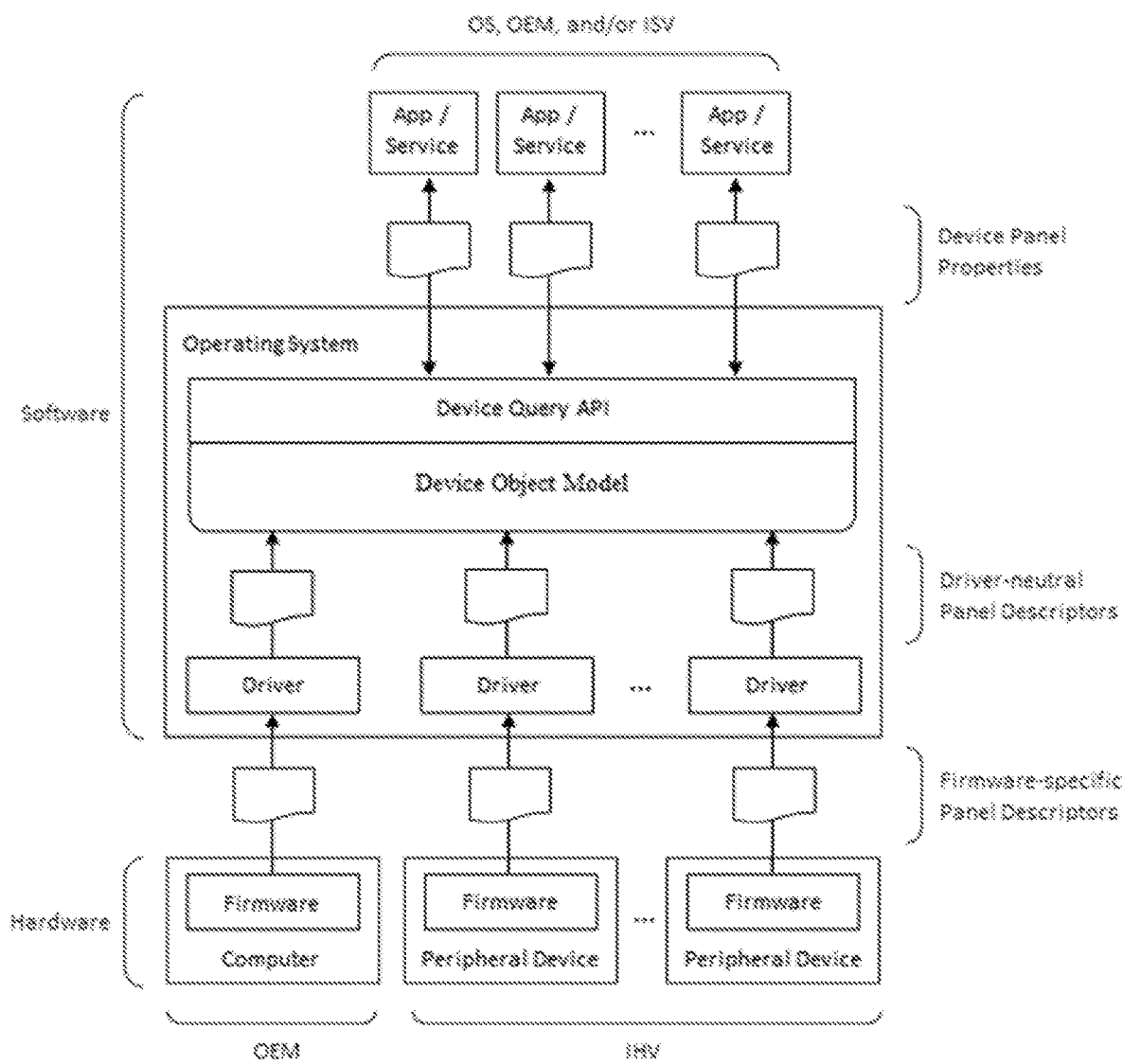
FIG. 36 is an exemplary system diagram illustrating the relationship, provided by the device panel object model, between hardware manufacturer defined spatial location/ relationship data and application software that consumes it.

FIG. 36 is a diagram illustrating the abstraction between the OEM/IHV manufacturers who typically define/produce the spatial location/relationship data for their hardware and the application software that ultimately consumes it, which is created by the device panel object model and its supporting OS infrastructure. The illustrative example of FIG. 36 depicts this relationship, including the parties/vendors involved and the format of the panel/location data exchanged between hardware and software components.

In this way, a hardware manufacturer, such as OEM (Original Electronics Manufacturer) or IHV (Independent Hardware Vendor) who designs, integrates, or otherwise manufactures a computer, peripheral device, or discrete device integrated into a computer may embed device location and/or panel descriptor data and spatial relationship information into their firmware using a standardized schema format. Such spatial information may subsequently by discovered by the OS via protocol bus drivers or other mechanism through which such devices are accessible so that it may be synthesized it into an object model and made available to applications and services executing through an API layer that abstracts the hardware/firmware-specific schemas. OS, ISV (Independent Software Vendor), or other $3^{rd}$ party supplied applications and services alike may use such an API to access and/or supplement the spatial device location and relationship information for the purpose of building richer software experiences that are aware of the spatial characteristics of the hardware they are running on.

Figure 37:
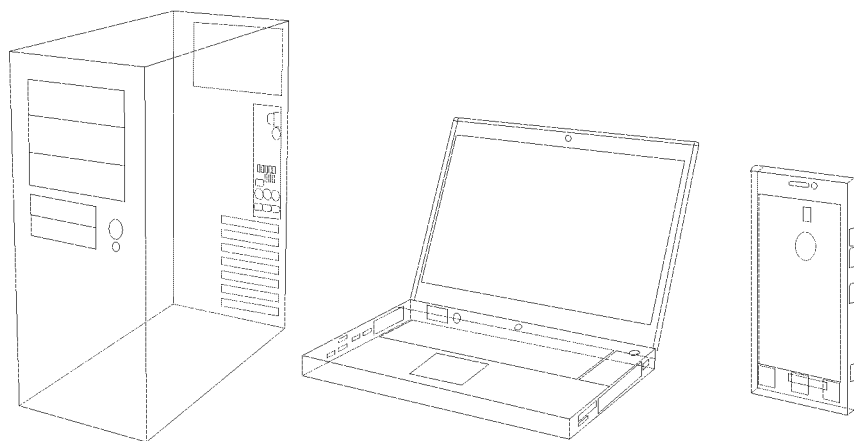
FIG. 37 is an exemplary block diagram illustrating three-dimensional (3D) representations of system enclosures using device panel and spatial relationship data models.

FIG. 37 is an exemplary block diagram illustrating three-dimensional (3D) representations of system enclosures using device panel and spatial relationship data models. The assembly of panel cabinets includes the following steps: 1) collect panel location properties across all device nodes to get all reference panel descriptors; 2) Group each set of reference panel descriptors and device location descriptors based on their cabinet numbers (panel groups); 3) For each cabinet, position and orient reference panels along with their relative device locations in 3D space to form cuboid; 4) Collect any device panel joint properties across related device node to get joint descriptors; and 5) For each panel with a joint descriptor: a) calculate 3D transform to position; and b) orient source cabinet adjacent to target cabinet.

The result is a data model that contains the following information: A list of cabinets, where each cabinet tracks 1) reference panels [0 . . . 5] and device panel locations, where each panel tracks: a) shape, position, orientation; b) joint; c) other panel attributes; 2) target joint, which may include a) cabinet, panel; b) hinge rotation; c) transform matrix; and any other suitable information.

Using this data model, it is possible to perform anything from a simple task to discover the physical position of device relative to a given panel on the system enclosure, through to rendering a complete 3D representation of the system enclosure, as shown in FIG. 37, including all cabinets, panels, and devices as described in a wide variety of established and yet-to-be-envisioned system configurations and form-factors.

For example, a 3D model rendering may provide an end-user with a rich visual experience for working with their computer and peripherals. In this example, if the OS or application needs the user to press a certain physical button or plug something into a specific physical port somewhere on the enclosure, the 3D model may visually highlight this for the user. Or if the user is having an issue with a specific device located on the enclosure, the 3D model may more easily point it out to the OS and/or application. In one example, a troubleshooter application may use this data model to draw the computer and/or peripherals for the user as they see them in the real world on their physical desktop, and point out an area of interest, like a loose network/audio connector, a Wi-Fi/Bluetooth hardware switch in the off position, or removable USB flash drive that needs to be formatted.

As another example, the 3D data model may be supplied or supplemented with panel and/or location definitions for in-design or prototype hardware, which may be used to aid with development to vet some scenarios before actually producing expensive hardware. This could also be useful for providing a head start on development of closely tied software before the hardware is actually produced.

Additional Examples

In some example scenarios, such as those involving externally connected devices, the device container relationships may still be useful for determining a natural affinity between devices within the same enclosure. For example, a scenario for managing visual-relations between input and output devices may use the shared-enclosure relationship between touch input and display devices in the same physical container (e.g. a tablet or an external touch monitor) to establish a default affinity between them. It may also recognize that an external mouse in a separate container from the system chassis may be more freely associated with any visual workspace, whereas the integrated touchpad mouse of a laptop might only be used with the visual workspace associated with the integrated display.

Similarly, an augmented-reality/virtual-reality experience may infer the association between the display, cameras, and sensors of a Head-Mounted Display based on their Container relationship. It may also choose to include other physical devices in separate physical containers in the same experience (physical tracking devices, virtual monitors, etc.) but they are not required to be a part of the same physical container to participate in the same experience.

While some limited ACPI _PLD information is provided today to describe the panel location and orientation of some devices, little information is provided about the chassis itself, or its panels. Aspects of this disclosure enable this additional description by providing a _PLD "reference" descriptor for each panel. The OS may be modified to recognize _PLD reference descriptors for the panels, in addition to full _PLD descriptors for all individual devices.

While the _PLD descriptor schema has previously assumed a system chassis with a single base (e.g. "desktop", "tablet", or "phone"), or a single base and a single lid (e.g. "laptop", or more generally a "clamshell"), which represents many existing form-factors, examples described herein enable a schema that considers future system designs with multiple bases and/or lids as well as yet-unknown designs. This additional information may be provided by utilizing the Cabinet Number field of the existing the existing _PLD buffer, which is used to describe a multi-cabinet system. The optional OEM-specific custom data buffers may be returned along with the standard _PLD buffer to additionally describe adjacencies between these extended cabinets of the system chassis.

Once this information is collected from the system ACPI tables, the device platform will build an internal model for the system enclosure, and where devices are located relative to it. This will be used to inform the results from a new API set that is used to help applications and system components discover and evaluate the relationship between devices on the system. This provides for a broader, richer set of device scenarios for applications and system components.

In some examples, whenever _PLD information is provided for a device in the ACPI namespace, it is stored as a property on the corresponding PnP device. System components and applications may retrieve this information directly using any of the available methods or APIs. Examples described herein provide an API for applications to retrieve the proposed "reference" _PLD elements that describe the physical attributes of the panels of the system chassis. With full _PLD information provided for devices by the system OEM, and a mechanism for applications to retrieve it, applications and system components may better understand how these devices relate to the system, and each other.

In other examples, the behavior of the device information enclosure location method may be modified such that it is aware of the application's current view. Depending on the display panel that is currently hosting the application view, the enclosure location panel property may return a different application view-relative value. A new property may be created to represent the absolute chassis-relative panel location of devices for applications that needed to know this information.

The schema described herein describes physical components and may be obtained and consumed by OS stacks and components. While the schema may not be surfaced to apps as is, each OS stack (touch, sensors, display) may provide suitable abstractions that also work with existing (and future) applications that only know of single-panel systems. These abstractions may serve a majority of applications. Where applications desire explicitly selection between multiple peripheral instances (or desire that the user select via picker), then the combination of <Panel Group ID>, <Panel ID> forms a beneficial selector. OEM applications are the canonical example of applications that may desire explicit dependency on (i.e. be coded for) form-factor.

As another example, device panel descriptors and/or location descriptors do not necessarily have to come from firmware tables. Instead they may be defined entirely in software, such as driver packages, Board Support Packages (BSPs), or other device related metadata. This capability would provide a method to supplement or even override descriptor information from firmware, in particular in the event that it is insufficiently or incorrectly defined, where the cost and/or practicality of updating the firmware in deemed untenable. Such a software or OS based panel/location descriptor table may be populated and stored in a persistent data store such as a registry or file that may be consulted by the device platform just like the ACPI, USB, and other bus drivers, for example.

Alternatively, or in addition to the other examples described herein, examples include any combination of the following:
    wherein the object model further includes the generated device panel objects and device location properties;
    wherein an application programming interface (API) queries a kernel manager to obtain the object model;
    wherein device panels are included as first-class objects of a device platform based on the object model;
    wherein the object model defines physical relationships of devices within the system, including spatial relationships;

wherein the device panel descriptors comprise panel properties, including cabinet associations, panel dimensions, and relationship data relative to one or more adjacent panels;

wherein the populated schema is cached as an object model in the operating system registry, the object model including the device panel objects and device location properties;

monitoring the associated device instances for dynamic changes;

updating the populated schema based on the dynamic changes;

wherein device panels are included as first-class objects of a device platform based on the populated schema;

wherein the populated schema defines physical relationships of devices within the system, including spatial relationships;

detecting an addition of at least one device dynamically attached to the computing system;

obtaining a device schema associated with the at least one detected device, the device schema comprising device panel locations and adjacency relationship information for the at least one detected device via a bus protocol of the computing device;

wherein the device panel descriptors comprise panel properties, including cabinet associations, panel dimensions, and relationship data relative to one or more adjacent panels;

caching the populated schema as an object model in the operating system registry, the object model including the device panel objects and device location properties;

receiving a query for the populated schema from an application programming interface (API);

wherein device panels are included as first-class objects of a device platform based on the populated schema;

wherein the populated schema defines physical relationships of devices within the system, including spatial relationships;

detecting an addition of at least one device dynamically attached to the computing system;

obtaining a device schema comprising device panel locations and adjacency relationship information for the at least one detected device via a bus protocol of the at least one detected device;

wherein the device panel descriptors comprise panel properties, including cabinet associations, panel dimensions, and relationship data relative to one or more adjacent panels.

While the aspects of the disclosure have been described in terms of various examples with their associated operations, a person skilled in the art would appreciate that a combination of operations from any number of different examples is also within scope of the aspects of the disclosure.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for obtaining a schema comprising device panel locations and adjacency relationship information for a computing device, exemplary means for using the obtained schema to perform one or more operations on the computing device, exemplary means for detecting an addition of at least one device dynamically attached to a computing device; and exemplary means for obtaining a schema comprising device panel locations and adjacency relationship information for the detected at least one device via a bus protocol of the computing device. The examples herein further provide exemplary means for populating a schema comprising device panel locations and adjacency relationship information for a computing device, and exemplary means for providing the populated schema to one or more operations executing on the computing device.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system comprising:
a memory area associated with a computing device housed by a first container, the memory area including an operating system and one or more applications; and
a processor that executes to:
classify device panel descriptors and location descriptors according to associated device instances housed within the first container and associated peripheral device instances housed within one or more peripheral containers,
generate device panel objects using the classified device panel descriptors and location descriptors,
populate an object model comprising device panel locations and adjacency relationship information for the associated device instances housed within the first container and the associated peripheral device instances housed within one or more peripheral containers based on the generated device panel objects, wherein an application programming interface (API) queries a kernel manager to obtain the object model, monitor the associated device instances housed within the first container and the associated peripheral device instances housed within one or more peripheral containers for dynamic changes, and responsive to detecting a dynamic change, dynamically updates the object model based on the detected dynamic change.

2. The system of claim 1, wherein the processor further executes to:

receive a query for dynamic device properties from the one or more applications executing on the computing device; and responsive to the received query, provide the dynamic device properties to the one or more applications based on the dynamically updated object model.

3. The system of claim 2, wherein the provided dynamic device properties indicate one or more application experiences available to the one or more applications.

4. The system of claim 1, wherein the object model is cached in an operating system registry.

5. The system of claim 1, wherein device panels are included as first-class objects of a device platform based on the object model.

6. The system of claim 1, wherein the object model defines physical relationships of devices of the system.

7. The system of claim 1, wherein the device panel descriptors comprise cabinet associations.

8. The system of claim 1, wherein the processor further executes to:

detect an addition of at least another associated peripheral device instance housed within another peripheral container; and obtain a device schema comprising device panel locations and adjacency relationship information of the at least another associated peripheral device instance housed within another peripheral container via a bus protocol of the at least another associated peripheral device instance.

9. A method for providing dynamic device properties to applications executing on a computing device housed by a first container, the method comprising:

classifying device panel and location descriptors according to associated multiple device instances housed within the first container and associated peripheral device instances housed within one or more peripheral containers;

generating device panel objects using the classified device panel and location descriptors;

populating a schema comprising device panel locations and adjacency relationship information for the associated multiple device instances housed within the first container and the associated peripheral device instances housed within one or more peripheral containers based on the generated device panel objects, wherein an application programming interface (API) queries a kernel manager to obtain the schema;

storing the populated schema in an operating system registry or data model of the computing device;

receiving a query for dynamic device properties from an application programming interface (API) of an application executing on the computing device; and providing the dynamic device properties based on the populated schema to inform the API of one or more application experiences compatible with the computing device and the application.

10. The method of claim 9 further comprising:

monitoring the associated device instances for dynamic changes; and updating the populated schema based on the dynamic changes.

11. The method of claim 9, wherein the device panel descriptors comprise cabinet associations.

12. The method of claim 9, wherein the provided dynamic device properties indicate one or more application experiences available to one or more of the applications.

13. The method of claim 9 further comprising:

detecting an addition of at least another associated peripheral device instance housed within another peripheral container; and obtaining a device schema comprising device panel locations and adjacency relationship information of the at least another associated peripheral device instance housed within another peripheral container via a bus protocol of the at least another associated peripheral device instance.

14. One or more computer storage devices having computer-executable instructions stored thereon for providing dynamic device properties to one or more applications executing on a computer, which, on execution by the computer, cause the computer to perform operations comprising:

classifying device panel descriptors and location descriptors according to associated device instances;

generating device panel objects using the classified device panel descriptors and location descriptors;

populating an object model comprising device panel locations and adjacency relationship information for the computing device based on the generated device panel objects, wherein an application programming interface (API) queries a kernel manager to obtain the object model;

monitoring the associated device instances for dynamic changes; and responsive to detecting a dynamic change, dynamically updating the object model based on the detected dynamic change.

15. The one or more computer storage devices of claim 14, having further computer-executable instructions which cause the computer to perform further operations comprising:

receiving a query for dynamic device properties from the one or more applications executing on the computing device; and responsive to the received query, providing the dynamic device properties to the one or more applications based on the dynamically updated object model.

16. The one or more computer storage devices of claim 14, wherein the provided dynamic device properties indicate one or more application experiences available to the one or more applications.

17. The one or more computer storage devices of claim 14, having further computer-executable instructions which cause the computer to perform further operations comprising:

caching the object model in an operating system registry.

18. The one or more computer storage devices of claim 14, wherein the computer is housed by a first container, wherein the classifying comprises classifying device panel descriptors and location descriptors according to associated device instances housed by the first container and peripheral device instances housed by one or more peripheral containers, and wherein the populating comprises populating an object model comprising device panel locations and adjacency relationship information for the first container and the one or more peripheral containers based on the generated device panel objects.

19. The one or more computer storage devices of claim 18, having further computer-executable instructions which cause the computer to perform further operations comprising:
- detecting an addition of at least another associated peripheral device instance housed by another peripheral container; and
- obtaining a device schema comprising device panel locations and adjacency relationship information of the at least another associated peripheral device instance housed by another peripheral container via a bus protocol of the at least another associated peripheral device instance.

* * * * *